United States Patent
Albrecht-Buehler

(10) Patent No.: US 8,595,824 B2
(45) Date of Patent: Nov. 26, 2013

(54) TASK-BASED ACCESS CONTROL IN A VIRTUALIZATION ENVIRONMENT

(75) Inventor: Conrad Albrecht-Buehler, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 169 days.

(21) Appl. No.: 13/041,150

(22) Filed: Mar. 4, 2011

(65) Prior Publication Data

US 2011/0219433 A1 Sep. 8, 2011

Related U.S. Application Data

(60) Provisional application No. 61/311,482, filed on Mar. 8, 2010.

(51) Int. Cl.
*G06F 21/00* (2013.01)

(52) U.S. Cl.
USPC .................................. 726/17; 726/4

(58) Field of Classification Search
None
See application file for complete search history.

(56) References Cited

U.S. PATENT DOCUMENTS

| | | | |
|---|---|---|---|
| 5,911,143 A * | 6/1999 | Deinhart et al. ................ | 1/1 |
| 2002/0174333 A1* | 11/2002 | Harrah et al. ................. | 713/166 |
| 2004/0243644 A1 | 12/2004 | Steere et al. | |
| 2006/0075253 A1 | 4/2006 | Sonkin et al. | |
| 2007/0282658 A1* | 12/2007 | Brintle ............................ | 705/9 |
| 2008/0307505 A1* | 12/2008 | Persaud-Deolall et al. ...... | 726/4 |
| 2009/0083087 A1 | 3/2009 | Wolter et al. | |
| 2009/0234788 A1 | 9/2009 | Kwok | |
| 2009/0249338 A1 | 10/2009 | Beg | |
| 2010/0132011 A1* | 5/2010 | Morris et al. ................... | 726/1 |

OTHER PUBLICATIONS

Oh et al. Task-role-based access control model Sep. 2003 Elsevier Science Ltd. Journal Infomration Systems vol. 28, Issue 6 pp. 533-562.*

Notification of Transmittal of the International Search Report and the Written Opinion of the International Searching Authority, or the Declaration, mailed May 6, 2011, Patent Cooperation Treaty.

* cited by examiner

*Primary Examiner* — David Pearson

(57) ABSTRACT

Methods, systems, and techniques for task-based access control are provided. Example embodiments provide a task-based access control system "TBACS," which provides task-based permissions management using proxy task objects. In one example embodiment, the proxy task objects encapsulate activities, comprising one or more privileges, each associated with an object upon which the privilege can act. In some examples, proxy task objects may be used with a virtualization infrastructure to delegate permissions to delegate users, real or automated. Proxy task objects may also be associated with their own user interfaces for performance of the corresponding activities.

30 Claims, 27 Drawing Sheets

Table 18-2. Required Privileges for Common Tasks

| Task | Required Privileges |
|---|---|
| Create a virtual machine (601) | On the destination folder or datacenter:<br>• Virtual Machine.Inventory.Create<br>• Virtual Machine.Configuration.Add New Disk (if creating a new virtual disk)<br>• Virtual Machine.Configuration.Add Existing Disk (if using an existing virtual disk)<br>• Virtual Machine.Configuration.Raw Device (if using a RDM or SCSI pass-through device) (621) |
| | On the destination host, cluster, or resource pool:<br>Resource.Assign Virtual Machine to Resource Pool (622) |
| | On the destination datastore or folder containing a datastore:<br>Datastore.Allocate Space (623) |
| | On the network that the virtual machine will be assigned to:<br>Network.Assign Network (624) |
| Deploy a virtual machine from a template (602) | On the destination folder or datacenter:<br>• Virtual Machine.Inventory.Create<br>• Virtual Machine.Configuration.Add New Disk |
| | On a template or folder of templates:<br>Virtual Machine.Provisioning.Deploy Template |
| | On the destination host, cluster or resource pool:<br>Resource.Assign Virtual Machine to Resource Pool |
| | On the destination datastore or folder of datastores:<br>Datastore.Allocate Space |
| | On the network that the virtual machine will be assigned to:<br>Network.Assign Network |
| Take a virtual machine snapshot | On the virtual machine or a folder of virtual machines:<br>Virtual Machine.State.Create Snapshot |
| | On the destination datastore or folder of datastores:<br>Datastore.Allocate Space |

TASK-BASED ACCESS CONTROL IN A VIRTUALIZATION ENVIRONMENT

CROSS REFERENCE TO RELATED APPLICATIONS

This application claims priority to U.S. provisional application 61/311,482 filed Mar. 8, 2010 and entitled "vBots: Embodiment of Access Control," which is hereby incorporated by reference.

TECHNICAL FIELD

The present disclosure relates to methods, techniques, and systems for generating and managing task-based access control and, for example, to methods, techniques, and systems for generating and managing task-based access control in a virtualization environment using proxy task objects.

BACKGROUND

The permissions model that defines access control in existing virtualization environments is object centric. In particular, each object has privileges associated with it that are required to manipulate it. For a delegated user (e.g., a user given proper authorizations from, for example, a systems administrator) to acquire access to an object, the user needs to be given the proper set of privileges—ones that match what the object expects in order to take some action with respect to that object. These privileges are used by the virtualization environment to determine whether a specific user at a particular time has access authority to perform an action that the user desires to perform. In some virtualization systems and in other computing environments, such privileges (e.g., access rights and the like) are grouped into "roles," and a user is allocated (e.g., designated, granted, assigned, directed etc.) roles based upon what activities he or she likely needs to perform within the infrastructure. A role tends to group together a large set of privileges, comprising many different activities a delegate user may need to perform over time. For example, a user acting in a system administrator role may need to perform different activities than a user acting in a software tester role.

For example, in a company with many employees that use virtual machines as testing environments for their software under development, it may be desirable to give access to each user to power on or off a particular virtual machine within the data center that has been configured for a particular test. Powering on a virtual machine might require one set of privileges, but a different task, such as moving the virtual machine to another host might require another set of privileges. It is not necessary in many such instances, or even desirable, that every user who has the ability to power on a virtual machine also be granted the ability to move his or her virtual machine to a different host in the infrastructure, as movement of virtual machines is often reserved to users involved in some aspect of the administration of the datacenter. Accordingly, on a frequent basis, especially in very large datacenters, system administrators need to define who has access to what within the virtualization infrastructure and exactly what those delegate users can do on various parts of the infrastructure. To properly grant access proactively, they therefore must predict ahead of time what roles various users will play with respect to the objects that are managed within the datacenter (sometimes referred to herein as managed inventory objects). Sometimes it is difficult to identify the full set of privileges necessary for a user to perform a particular task because many different, seemingly unrelated privileges may be necessary to perform that task. In addition, in some virtualization environments, permissions are propagated through complex inheritance structure rules, and thus it may be difficult for the administrator to understand exactly what permissions a particular user has been given at any time.

FIGS. 1A-1I are example screen displays of an existing user interface for administering permissions in a virtualization infrastructure according to a role-based paradigm. These displays have been generated from a VMware datacenter virtualization management product called vSphere™. FIG. 1A illustrates that a role 101 comprise privileges 102a-102d; a role 101 is associated with objects 122a-122d from an inventory objects folder 121 (e.g., managed objects in the datacenter inventory); a role 101 is associated with users 112a-112d, illustrated here as stored in an ActiveDirectory group 111; and inventory objects folder 121 is associated also with users 112a-112d in ActiveDirectory group 111. All three elements, one or more roles 101, objects folder 121, and the group of users 111 are used to define what a particular user is able to do with what object in the infrastructure. Each element also is associated with its own specialized user interface: role 101 is managed by roles interface 100; inventory object folder 121 is managed by user interface 120; and users (and groups of users) 111 are managed by interface 110.

In order to grant access to a user, under this system, the administrator either assigns an existing role to a user or defines a new role. FIG. 1B illustrates use of the user interface 100, here shown as dialog 131 in the vSphere client window 130, to define a new role called "VMs Only." "VM" here refers to a virtual machine. As shown in FIG. 1B, the administrator selects which privileges, for example privilege "power on" 133 in the vApp category 132 for powering on a virtualized application. After selecting all of the desired privileges, the new role "VMs Only" 134 appears in the roles window of FIG. 1C as not yet in use (output text 135) since it has yet to be assigned to a particular user.

The administrator now needs to determine to which object to associate the role using user interface 120 (FIG. 1A). FIG. 1D illustrates that the administrator has selected an object in the datacenter "Bobby's VMs" (a folder) to which the new role will be assigned. The current set of roles already allocated to the object "Bobby's VMs" are shown under the permissions tab 142. To add the newly developed role "VMs Only," the administrator brings up the assign permissions dialog through add permissions menu 143 or other user interface (UI) control. The assign permissions dialog 150, as shown in FIG. 1E, allows the administrator to select the newly defined role 153 from a roles menu 152. The administrator also can indicate using UI control 154 whether objects further down in the object definition hierarchy will inherit this role as well. For example, all virtual machines (VMs) in Bobby's folder may inherit this role assignment because the UI control 154 has been selected. When the administrator indicates that the administrator is done (by, for example, pressing the "OK" button 155), the administrator can then select the users and/or groups who will be assigned the new role.

FIG. 1F illustrates an example process for selection of a user for role assignment. In a separate user selection dialog 160 (e.g., UI 110 in FIG. 1A), the administrator chooses that Bobby (icon 161) will have the new role assigned to him. Once this entire cycle is complete (define new role, assign to an object, assign to a user/group), the administrator can see in field 171 of the assign permissions dialog 150, as shown in FIG. 1G, that the new role "VMs Only" has been assigned to Bobby and an indication 172 of what permissions are available to Bobby in that role. The administrator can check, using the inventory UI illustrated in FIG. 1H, that the new permissions 182 have been assigned to Bobby 181 with respect to the object Bobby's VMs. As shown in FIG. 1I, when the administrator now looks at the roles defined in the system, the administrator can see the new role 134 and where and to whom it has been assigned (description 191).

Unfortunately, without asking Bobby to actually try out his newly assigned permissions, the administrator has little idea whether Bobby's new role will work as intended. If Bobby tries to add a new virtual machine and it doesn't operate as expected (e.g., he receives an error message), then the administrator must cycle through some number of the dialogs again to add more privileges and/or assign them to different inventory objects, round and round, until Bobby is successful. Moreover, because of the intricate structure of the propagation and inherency of roles across the infrastructure, it may be difficult to determine which roles are in actuality accessible to Bobby.

BRIEF DESCRIPTION OF THE DRAWINGS

FIG. 6 is an excerpt from table listing privileges for performing common tasks in an example virtualization environment.

FIGS. 9A-9J are example screen displays of a user interface for generating, deploying, and assigning proxy task objects in a virtualization environment according to an example task-based access control system.

DETAILED DESCRIPTION

Embodiments described herein provide enhanced computer- and network-based methods, systems, and techniques for task-based access control, in particular as applied to virtualization environments. Example embodiments provide a task-based access control system ("TBACS"), which enables system administrators and other such users to assign privileges to delegate users based upon the tasks they wish to allow them to do and not based upon who the user is (i.e., what role the user has been assigned). This enables administrators of the system to be purposeful and accurate when they enable a delegate user to perform some activity. In summary, the techniques encapsulate privileges along with the objects they can act on in order to accomplish a task (e.g., one or more activities), so that the delegate user is assigned a privilege-object pair directed to a particular portion of the virtualization infrastructure. These encapsulations are referred to in this description as "proxy task objects" since they represent a proxy for accomplishing one or more tasks. In addition, proxy task objects may be executed in an automated manner, without actual assignment to human users (the delegate users may be physical human beings or virtual or automated users). Proxy task objects may be cloned, moved, shared, and the like, as with other objects in the system. In addition, they can be placed "on loan," for example, when a particular delegate user is on vacation. Also, they can be temporarily enabled or disabled after being assigned to a delegate user. Since tasks are typically performed many times, once the administrator "debugs" an encapsulation of these privilege-object pairs, the administrator can be assured that the delegate user will have sufficient, and likely only the necessary, privileges to accomplish the desired, already tested, task. Also, the TBACS paradigm may overlay an existing role-based permissions system so as to not require underlying changes to the system security model.

Although the techniques, methods, and systems described herein are described relative to virtualization infrastructures and environments, these techniques also may be useful to grant (e.g., allocate, assign, give, render etc.) permissions in a variety of other environments.

Figure 1A:
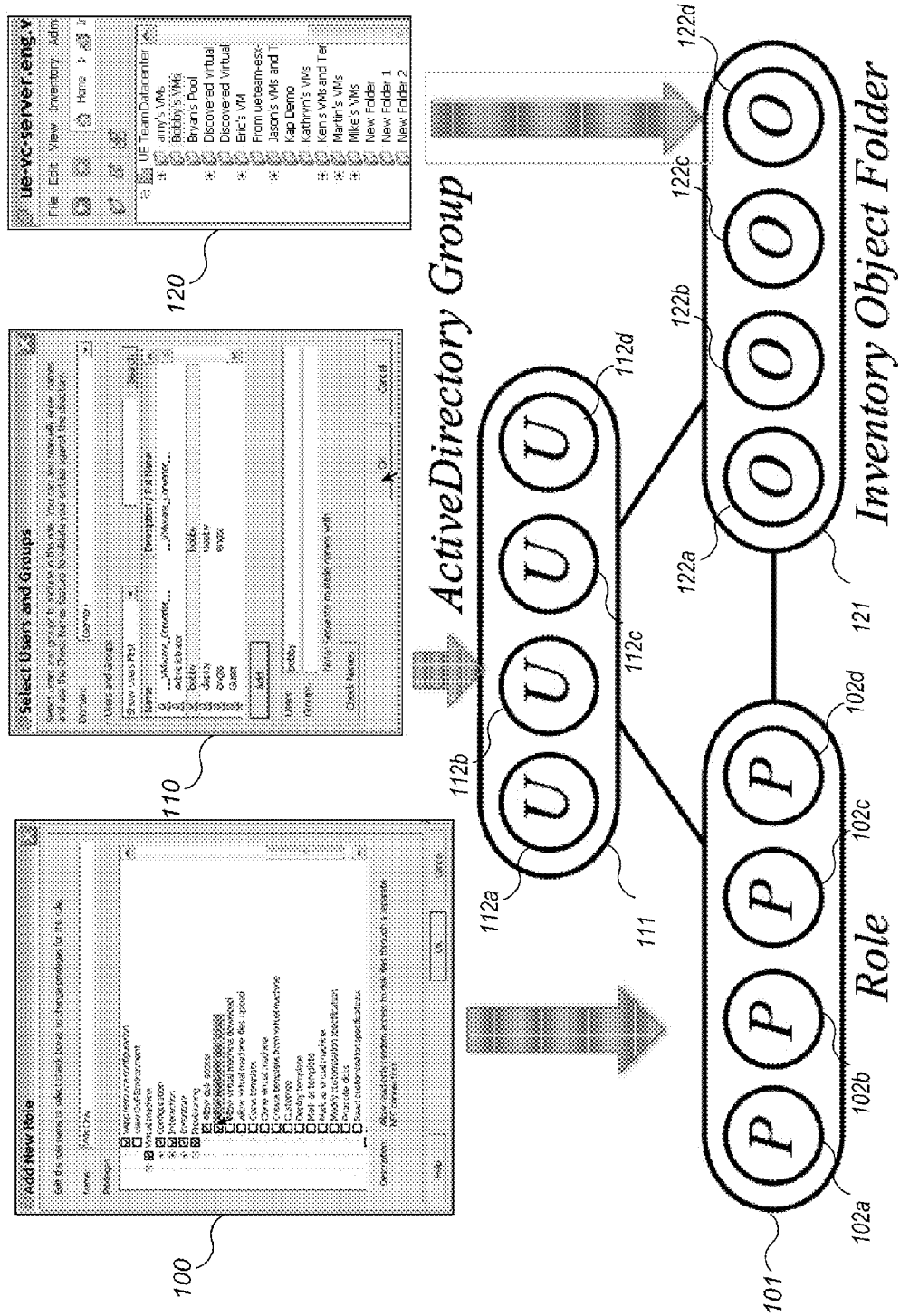
FIGS. 1A-1I are example screen displays of an existing user interface for administering permissions in a virtualization infrastructure according to a role-based paradigm.
Figure 1B:
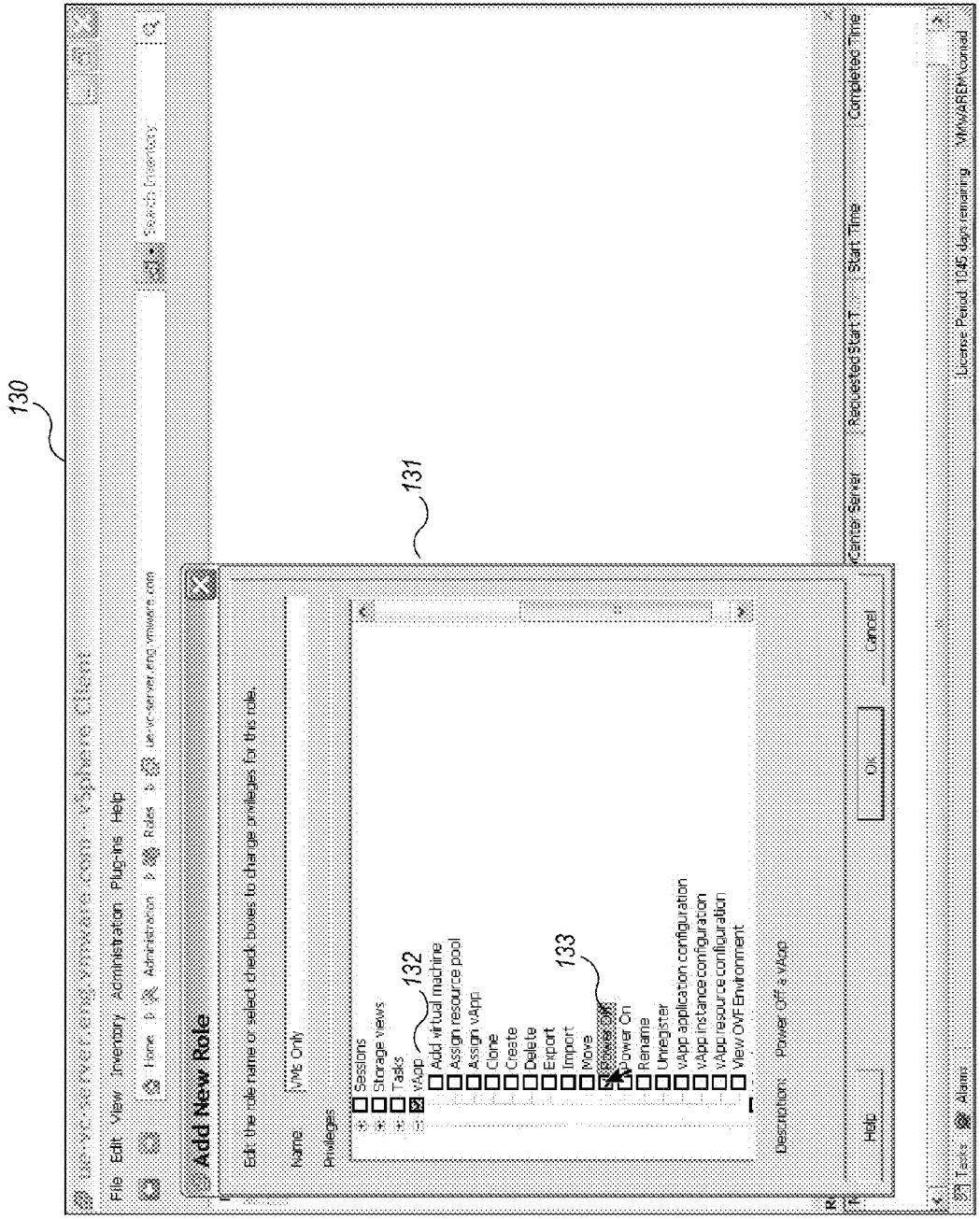
Figure 1C:
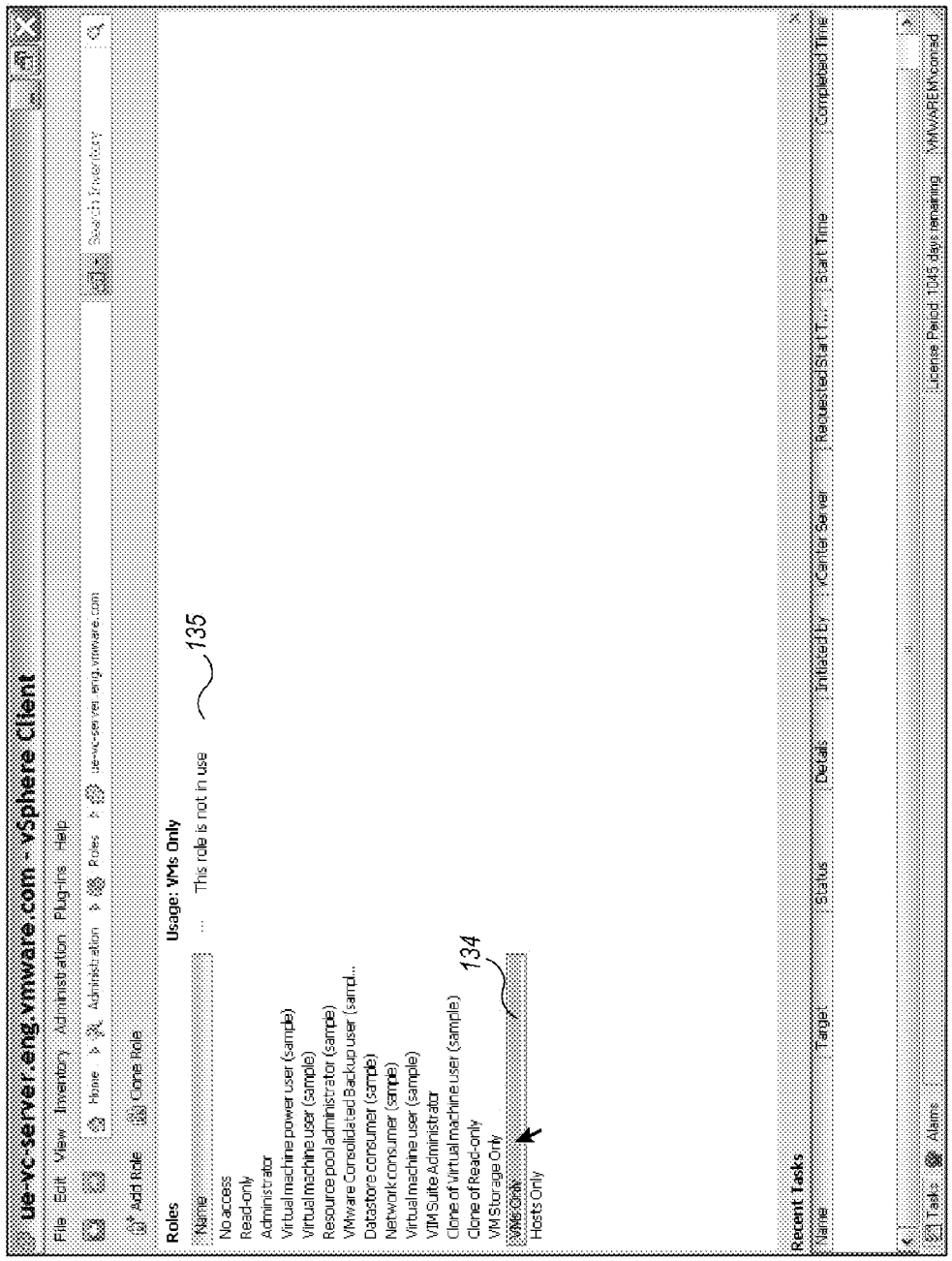
Figure 1D:
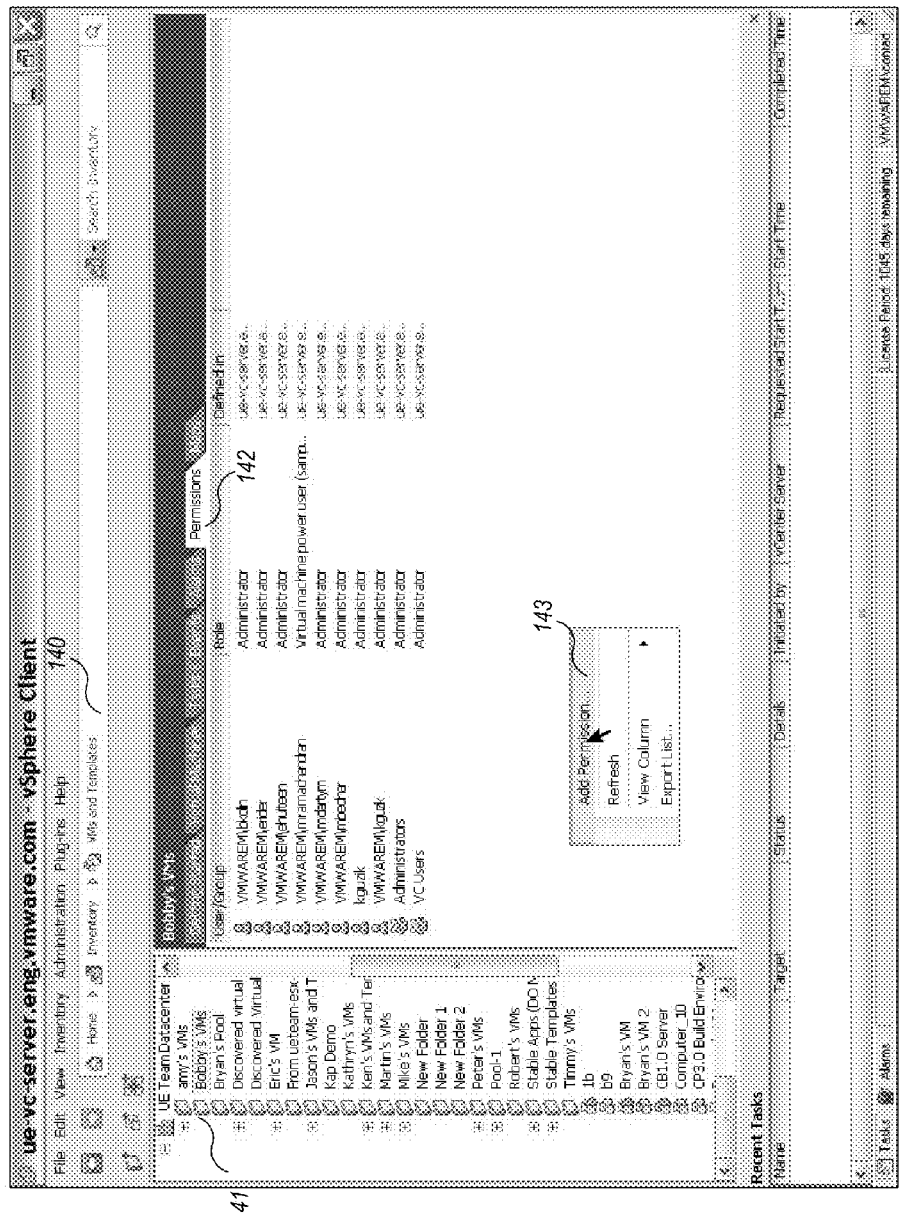
Figure 1E:
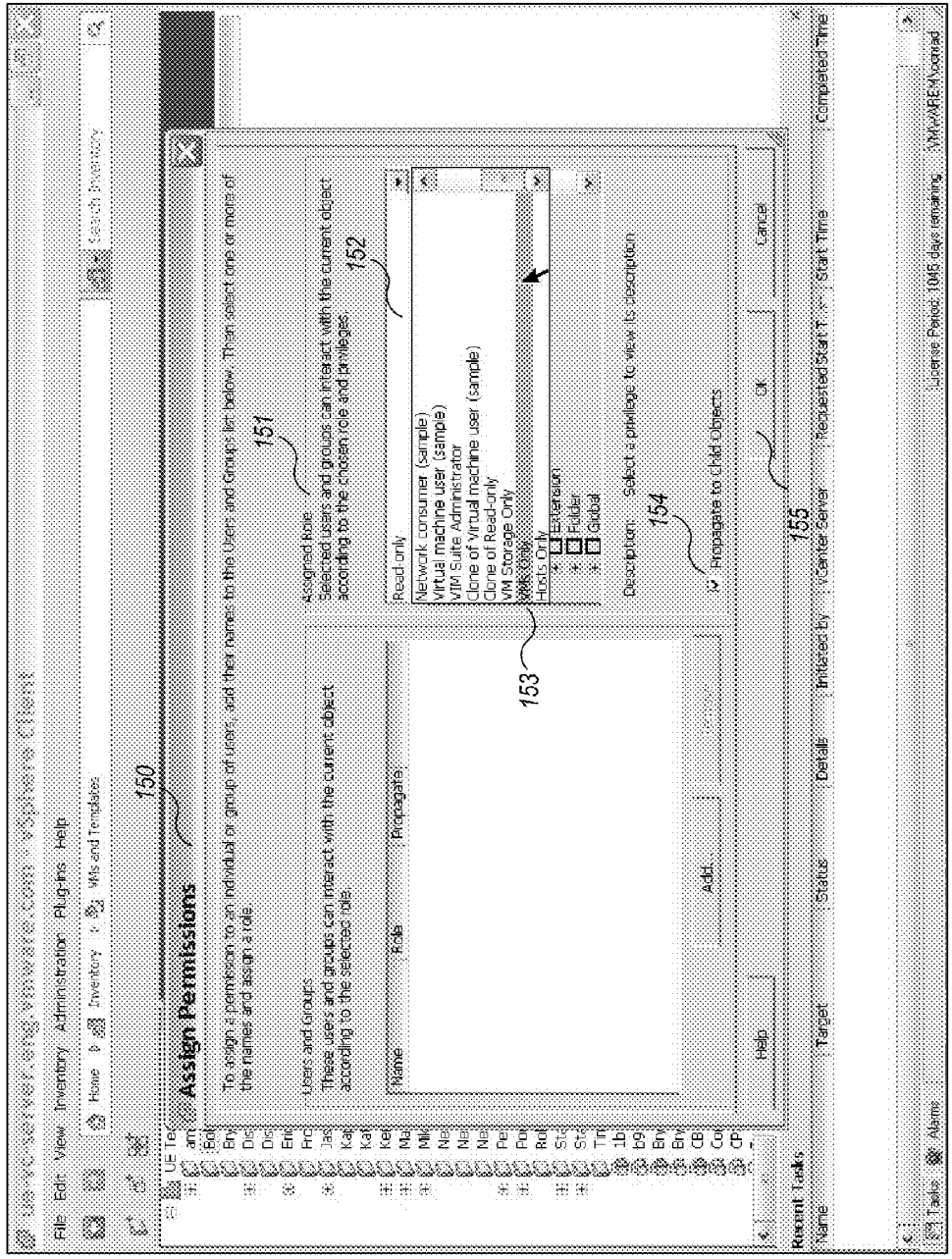
Figure 1F:
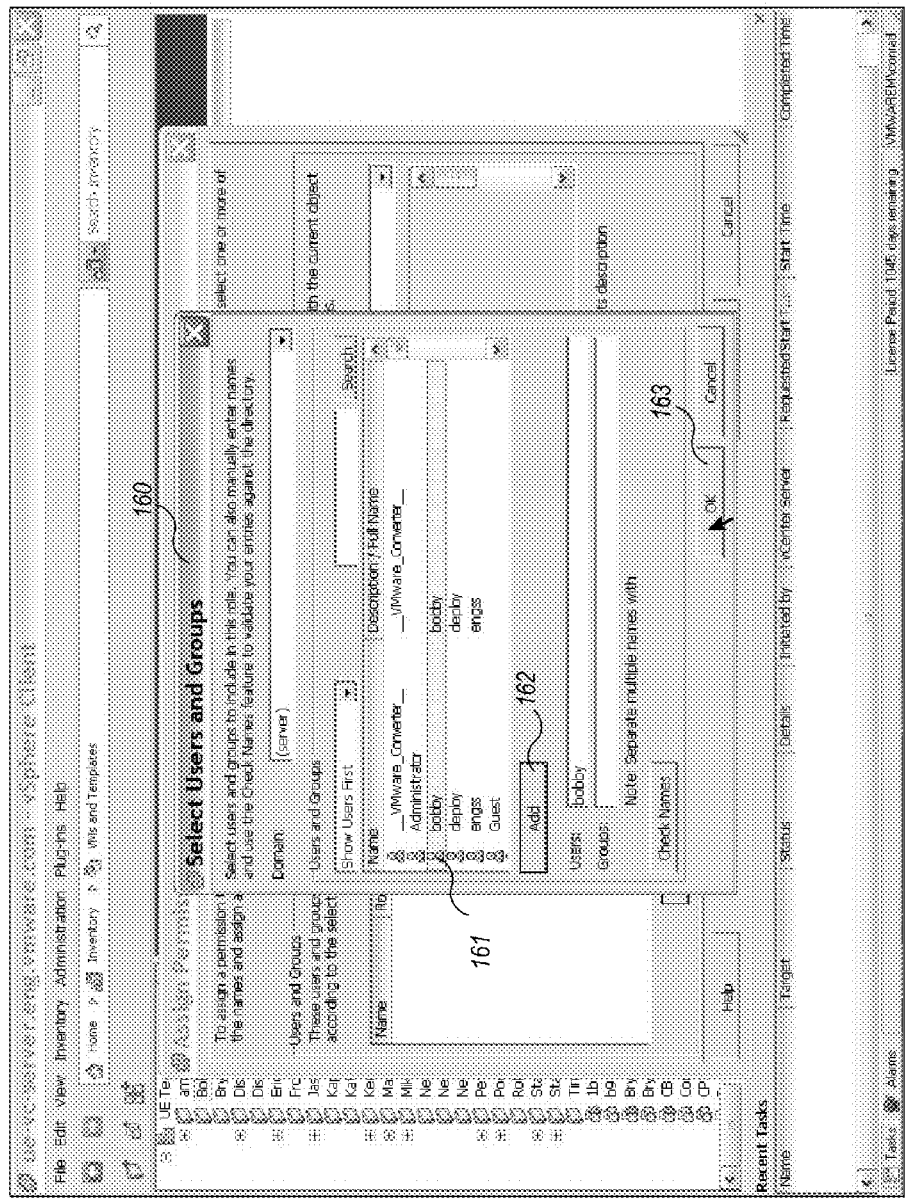
Figure 1G:
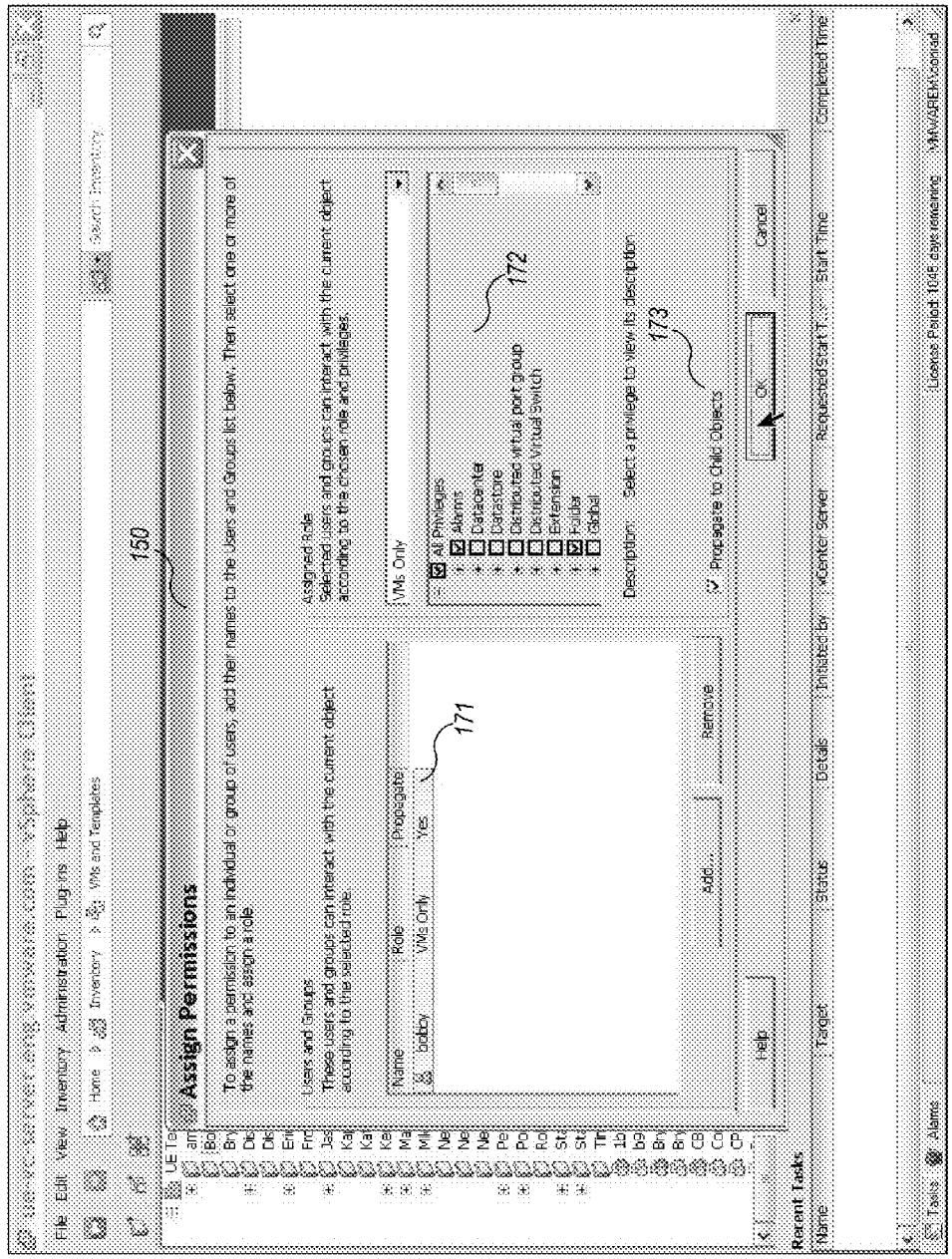
Figure 1H:
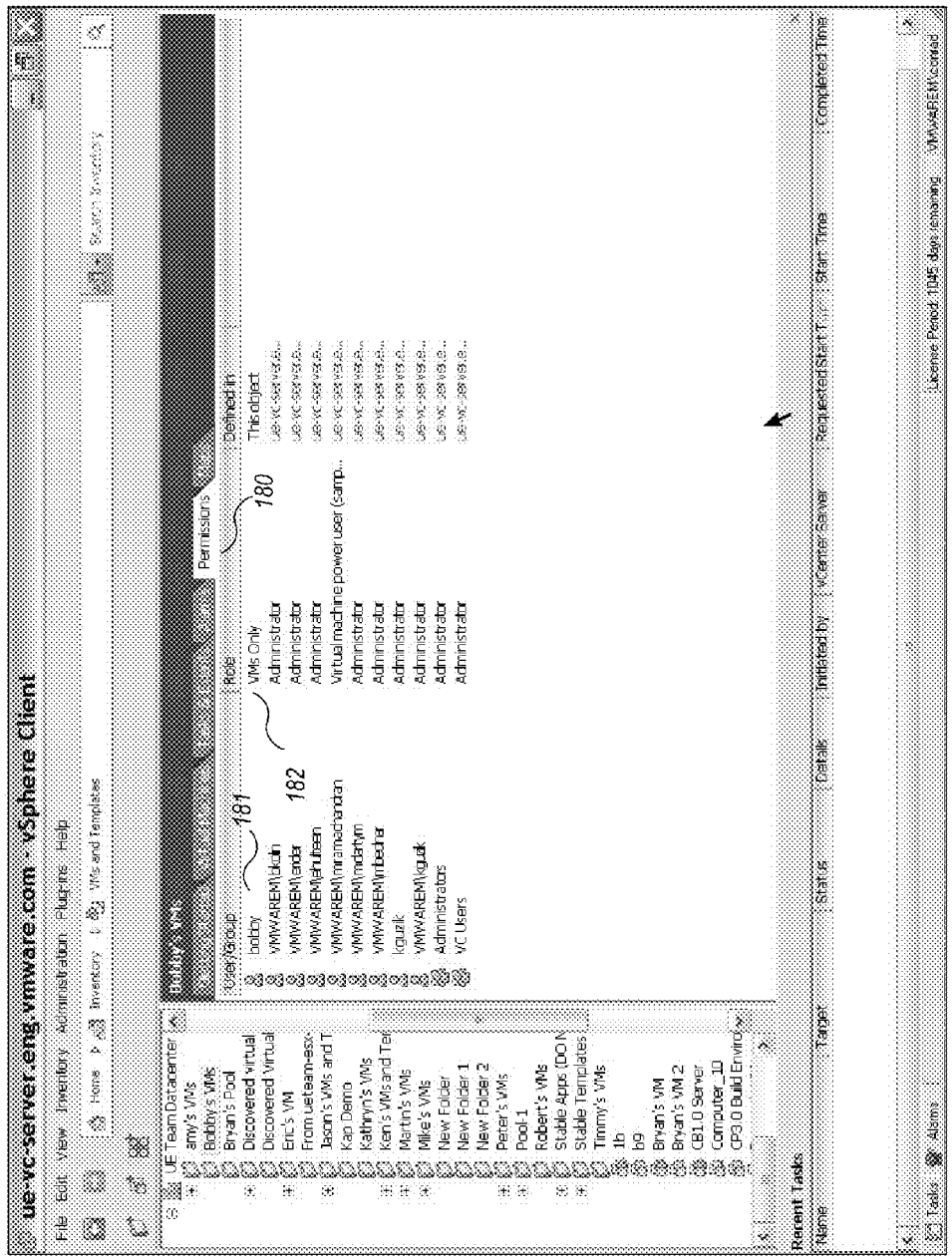
Figure 1I:
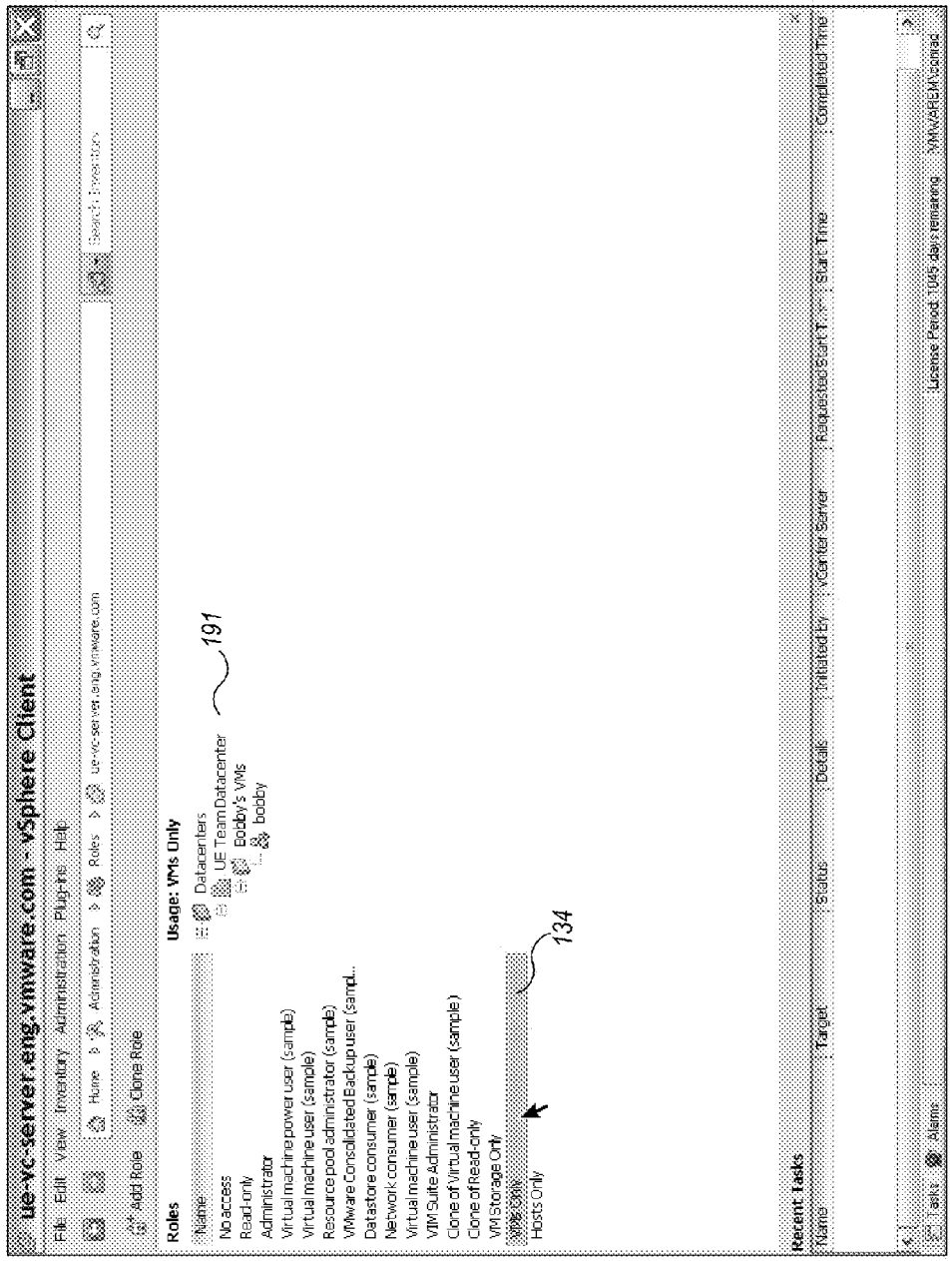
Figure 2:
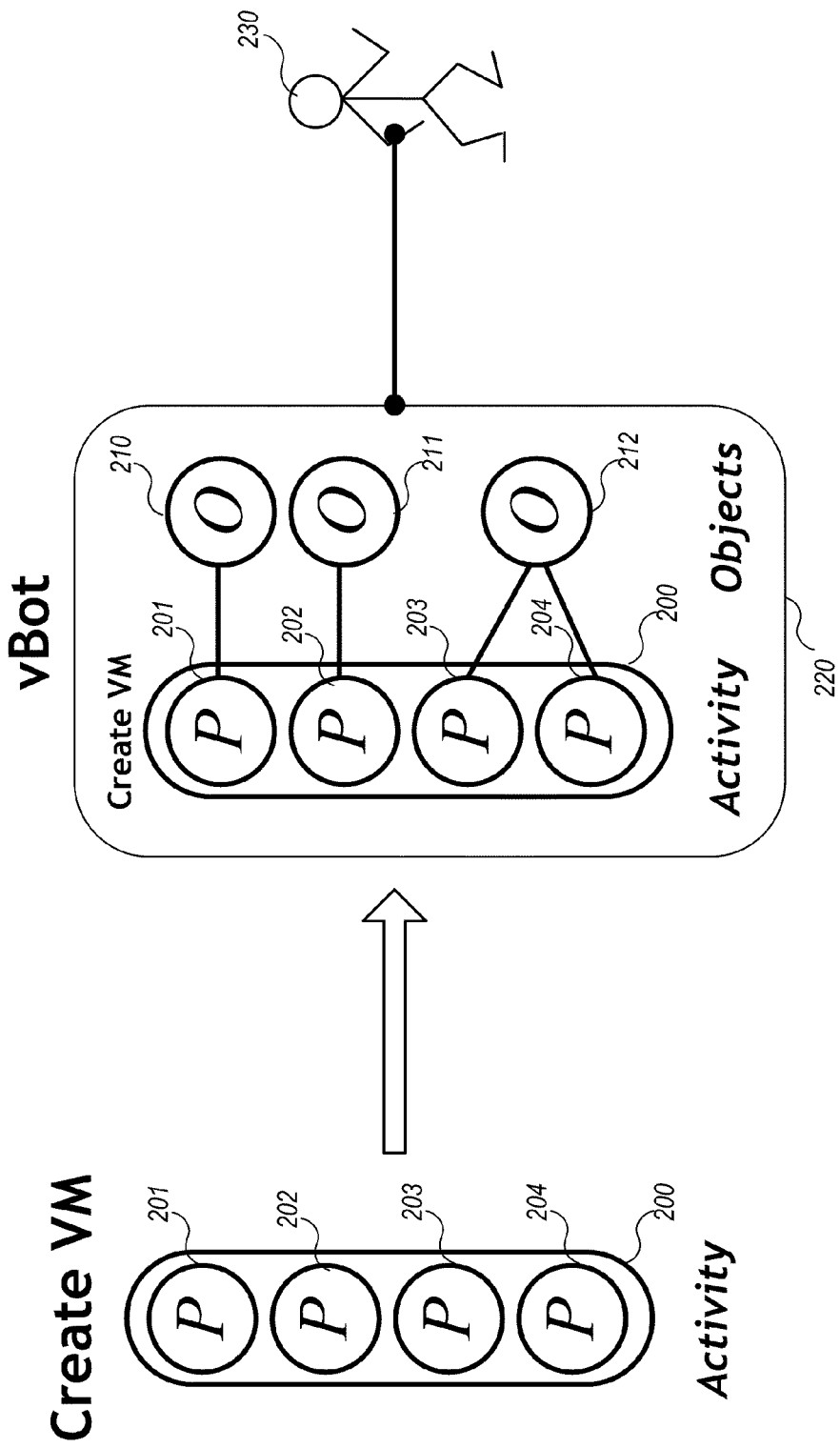
FIG. 2 is an example block diagram of a representation of an activity and of a proxy task object (e.g., a vBot) built by an example task-based access control system.

FIG. 2 is an example block diagram of a representation of an activity and of a proxy task object (e.g., a vBot) built by an example task-based access control system. According to a task-based paradigm, privileges 201-204 define an activity 200. Since the privileges are grouped into activities (e.g., tasks, goals, objectives, and the like), in some embodiments there may be less privileges required for an activity than might be otherwise grouped into a role (see, for example, role 101 in FIG. 1A). This allows an administrator to tailor the privileges to the true task at hand. Once an activity is defined, a proxy task object can be created (e.g., authored, generated, cloned, and the like) and made ready for assignment to a user or group of users (i.e., deployed).

Proxy task object 220 is an example proxy task object for the activity "Create VM" (create a virtual machine) defined by activity 200. In one example embodiment, proxy task objects such as object 220 are referred to as "vBots" (virtualization robots) and the terms as used herein are interchangeable. Initially, a proxy task object such as object 220 is created without resolving (e.g., linking, assigning, associating, binding, etc.) the privileges 201-204 to specific objects (i.e., objects in the managed object inventory of a virtualization infrastructure). The privileges may be created as being applicable to particular object types, but not necessarily resolved to specific named objects. In such a state, the proxy task object may be referred to as a "prototype," since it can be used as a master key to create proxy task objects of that "type," analogous to creating keys for different doors.

In FIG. 2, the proxy task object 220 (vBot) contains privileges 201-204 for one activity, the Create VM activity 200. Each privilege 201-204 of each activity 200 is resolved to an object upon which it can act, here objects 210-212, which represent objects from the virtualization infrastructure. In some embodiments, proxy task objects can be bound to a variety of objects, entities, controls, or processes in a virtualization infrastructure, including, for example: alarms, datacenters, data stores, distributed virtual port groups, distributed virtual switches, extensions, folders, globals, host common information modes, host configurations, host inventories, host local operations, host profiles, networks, performance, permissions, resources, scheduled tasks, sessions, tasks, virtual applications, virtual machine configurations, virtual machine interactions, virtual machine inventories, virtual machine provisioning, virtual machine states, or the like. Of note, one or more privileges, here privileges 203 and 204 can be associated with the same object 212. In one embodiment, each privilege is bound to no more than one object. Other embodiments may support one-to-many relationships. Once the proxy task object 220 has all of its privileges resolved to particular objects, it can be deployed and hence assigned to delegate user 230.

Figure 3:
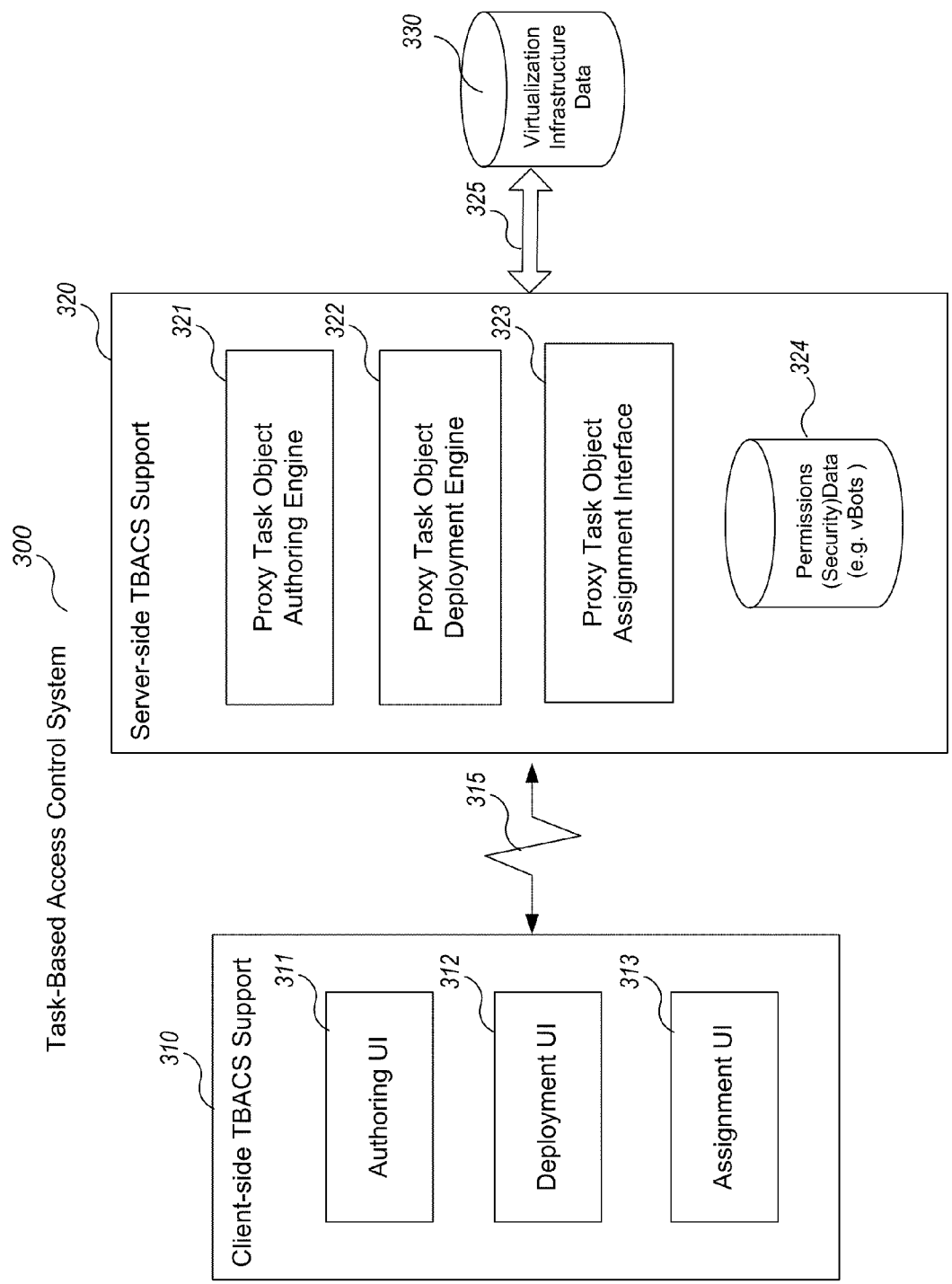
FIG. 3 is an example block diagram of components of an example task-based access control system.

FIG. 3 is an example block diagram of components of an example task-based access control system. The task-based access control system of FIG. 3 may be used to generate and manage the proxy task object illustrated in FIG. 2. In one embodiment, the task-based access control system 300 comprises one or more functional components/modules that work together to generate and manage access control permissions through the use of proxy task objects. These components may be implemented in software or hardware or a combination of both. As shown in FIG. 3, a task-based access control system 300 comprises client-side support 310 and server-side support 320 that communicate over communications channel 315. Equivalent non-client-server (e.g., single computer system) implementations may also be used. The server-side support comprises one or more proxy task object authoring engines 321, one or more proxy task object deployment engines 322, and one or more proxy task object assignment interfaces 323 that interact with permissions data repository 324 and, in a virtualization embodiment, with virtualization infrastructure data repository 330, which may store for example, information concerning the managed object inventory. The client-side support 310 comprises authoring user interface 311, deployment user interface 312, and assignment interface 313. Each of the user interfaces 310-313 corresponds to its associated engine on the TBACS server-side support 320. Many different user interfaces may be incorporated, examples of some of which are described with reference to FIGS. 9A-9J below.

The proxy task object authoring engine 321 and associated authoring user interface 311 are responsible for generating proxy task object prototypes (e.g., vBot prototypes) with activities having one or more privileges associated with them. When initially generated, the privileges may be associated with particular types of objects, but they may not yet be in deployable form—i.e., bound to a specific inventory managed object associated with a respective privilege. Proxy task object prototypes may be generated from scratch, cloned and edited from existing proxy task objects or proxy task object prototypes, and the like.

The proxy task object deployment engine 322 and associated deployment user interface 312 are responsible for resolving the object type references of each privilege of each activity of the proxy task object to specific objects of the managed object inventory. When each privilege is resolved (i.e., associated with an assigned object), the proxy task object is releasable for assignment as a proxy task object to be assigned to users. In embodiments outside the virtualization environment context, other objects (other than objects from the managed object inventory) may similarly be bound to proxy task objects.

The proxy task object assignment interface 323 and associated assignment user interface 313 is responsible for allowing the proxy task object (with its privilege—object pair associations) to be assigned to a user. As indicated above, proxy task objects may be assigned to one or more users or groups of users based upon the task the user desires to perform.

Figure 4:
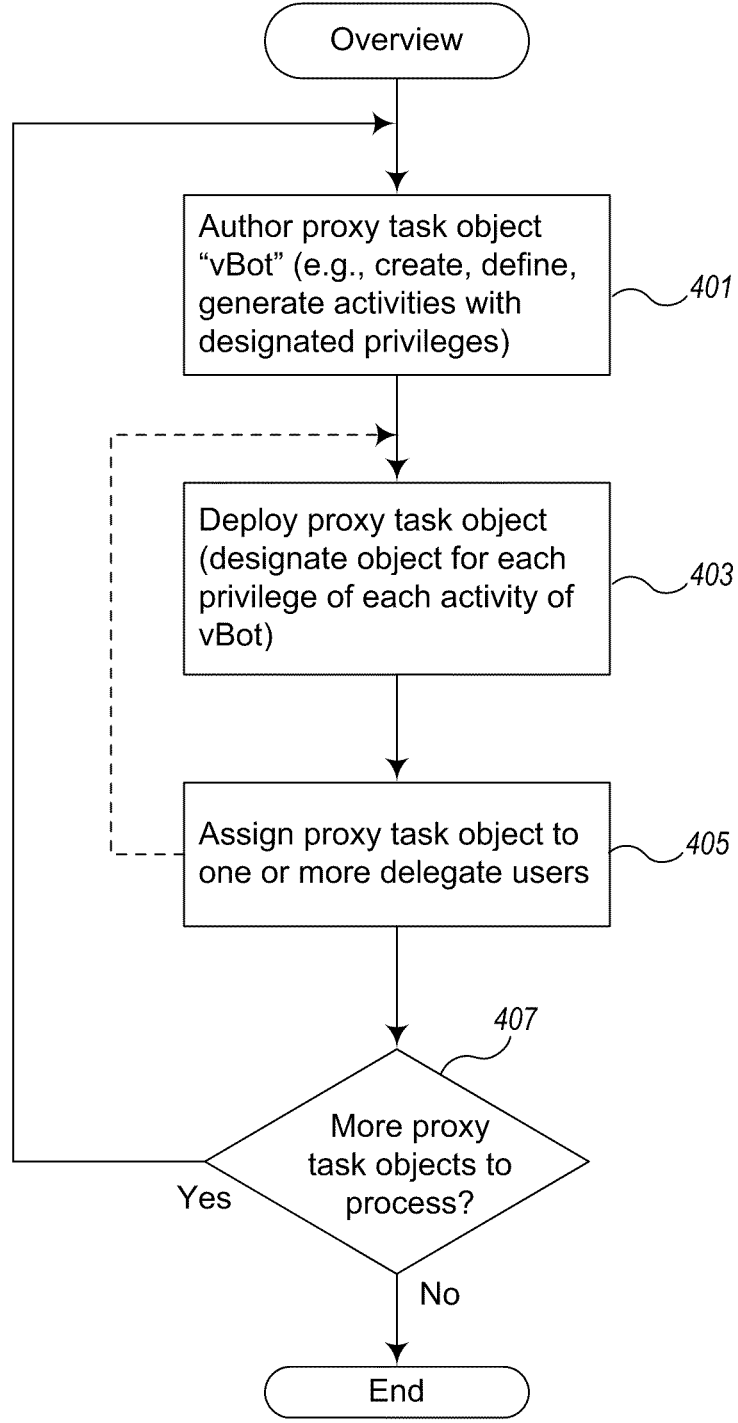
FIG. 4 is an example flow diagram of an overview of an example process for generating and managing task-based access control.

FIG. 4 is an example flow diagram of an overview of an example process for generating and managing task-based access control. The components of the task-based access control system illustrated in FIG. 3 may be used to implement the logic of FIG. 4. Blocks 401-405 are performed for each proxy task object to be generated and managed. In block 401, an administrator (or equivalent person or automated delegate) authors a proxy task object having activities with designated privileges. Authorship is described further with respect to FIGS. 5, 6, and 7. In block 403, the administrator deploys the proxy task object by designating an acceptable object for each privilege of each activity. Deployment is described further with respect to FIG. 8. In block 405, the administrator assigns the deployed proxy task object to one or more delegate users. Assignment is described further with respect to FIGS. 9A-9J. Once a proxy task object is deployed and assigned, the administrator may optionally redeploy and/or reassign the proxy task object as desired, as indicated by the dashed lines from block 405 to block 403. In block 407, it is determined whether there are additional proxy task objects to handle and, if so, the logic returns to block 401 to process additional proxy task objects, otherwise ends.

Figure 5:
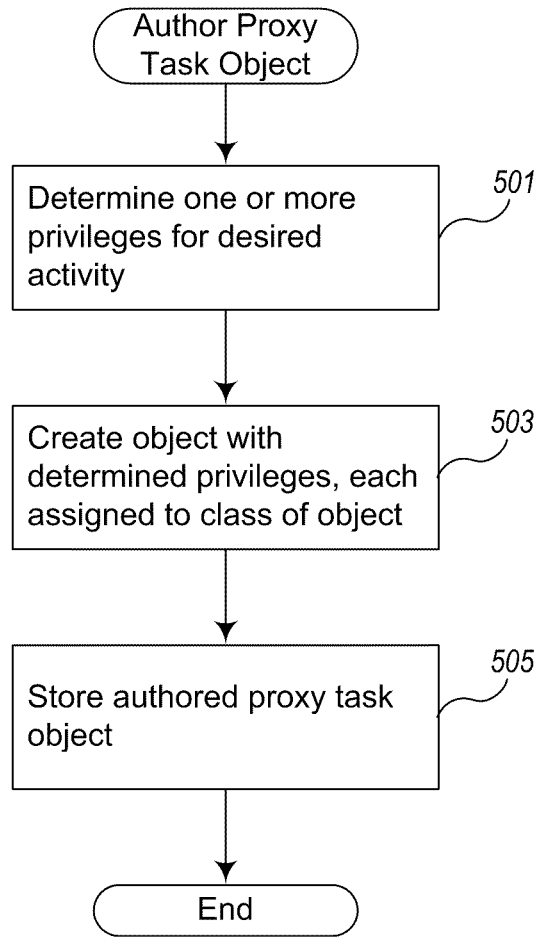
FIG. 5 is an example flow diagram of example logic for authoring a proxy task object according to an example task-based access control system.

FIG. 5 is an example flow diagram of example logic for authoring a proxy task object according to an example task-based access control system. In block 501, the administrator (or equivalent person or automated delegate) determines one or more privileges for each desired activity. The privileges may be determined from existing lists, such as the table described below in FIG. 6, "know how" of the administrator, other guides, etc. In block 503, the administrator creates the object (using for example, standard object-oriented programming commands, declarative language, or the like) and assigns each privilege to a type of object. For example, certain privileges may be only applicable to host machines, others to data repositories, etc. Once created, then in block 505 the proxy task object is stored in the system.

As mentioned, one of the first steps in authoring a proxy task object is to determine appropriate privileges for the desired task. FIG. 6 is an excerpt from table listing privileges for performing common tasks in an example virtualization environment. This example excerpt is from a table in Chapter 18 of the VMware, Inc., "vSphere Basic System Administration Guide for vCenter Server 4.0, ESX 4.0, ESXI 4.0," CA 2010, part EN-000105-06, which is incorporated herein by reference in its entirety. Table 600 describes several common tasks, for example "create a virtual machine" task 601 and "deploy a virtual machine from a template" task 602. For each such task, the table lists required privileges, e.g., privileges 621-624. These privileges can be used as a sort of checklist to make sure the correct privileges are created and then bound (e.g., resolved, assigned, etc.) to appropriate objects in the infrastructure.

Figure 7:
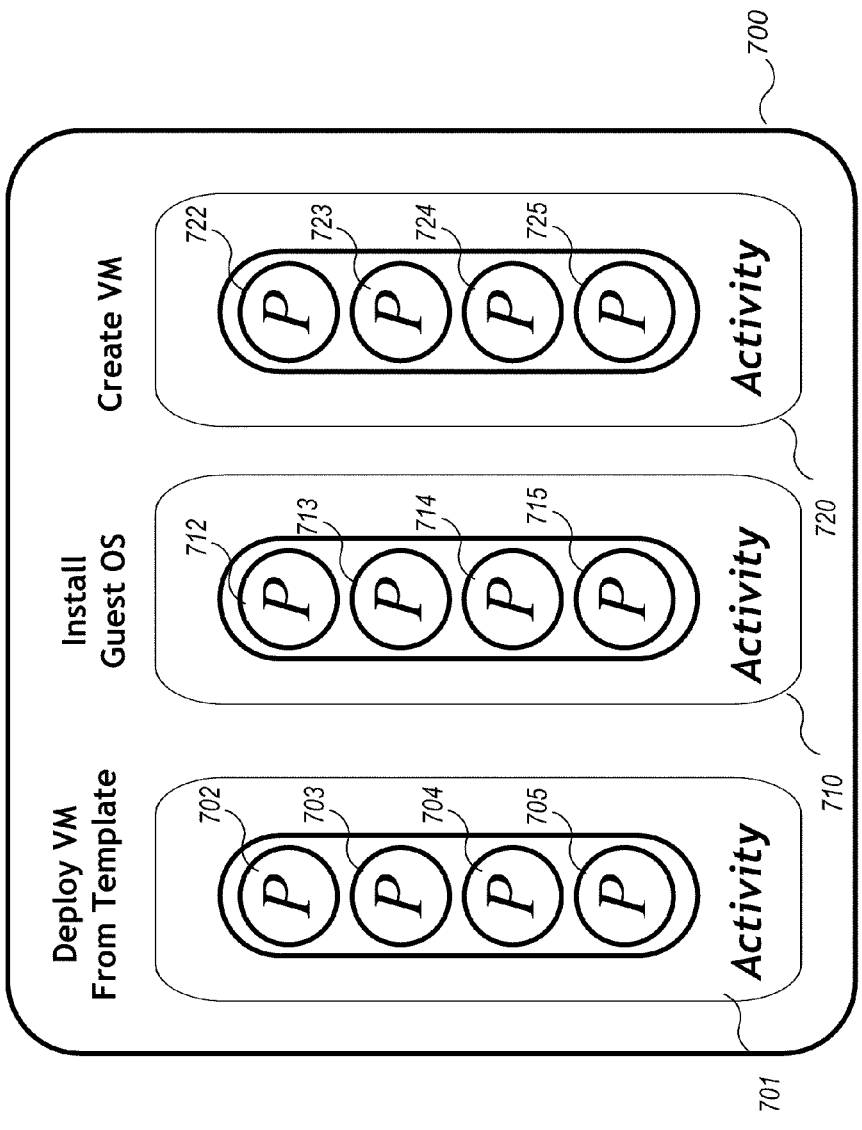
FIG. 7 is an example block diagram of a representation of an example prototype proxy task object (e.g., a vBot Prototype).

FIG. 7 is an example block diagram of a representation of an example prototype proxy task object (e.g., a vBot Prototype). In the example illustrated, proxy task object 700 comprises 3 activities: Deploy VM From Template—activity 701; Install Guest OS—activity 710; and Create VM—activity 720. These activities and their respective privileges 702-705, 712-715, and 722-725 have been determined based upon input such as from the table shown in FIG. 6, equivalent expertise, experimentation, third party or other external input, and the like. Because the privileges are not yet resolved to actual objects in the infrastructure inventory, the proxy task object is considered in "prototype" stage and can be used to create proxy task objects of this type or resolved to create an assignable proxy task object.

Figure 8:
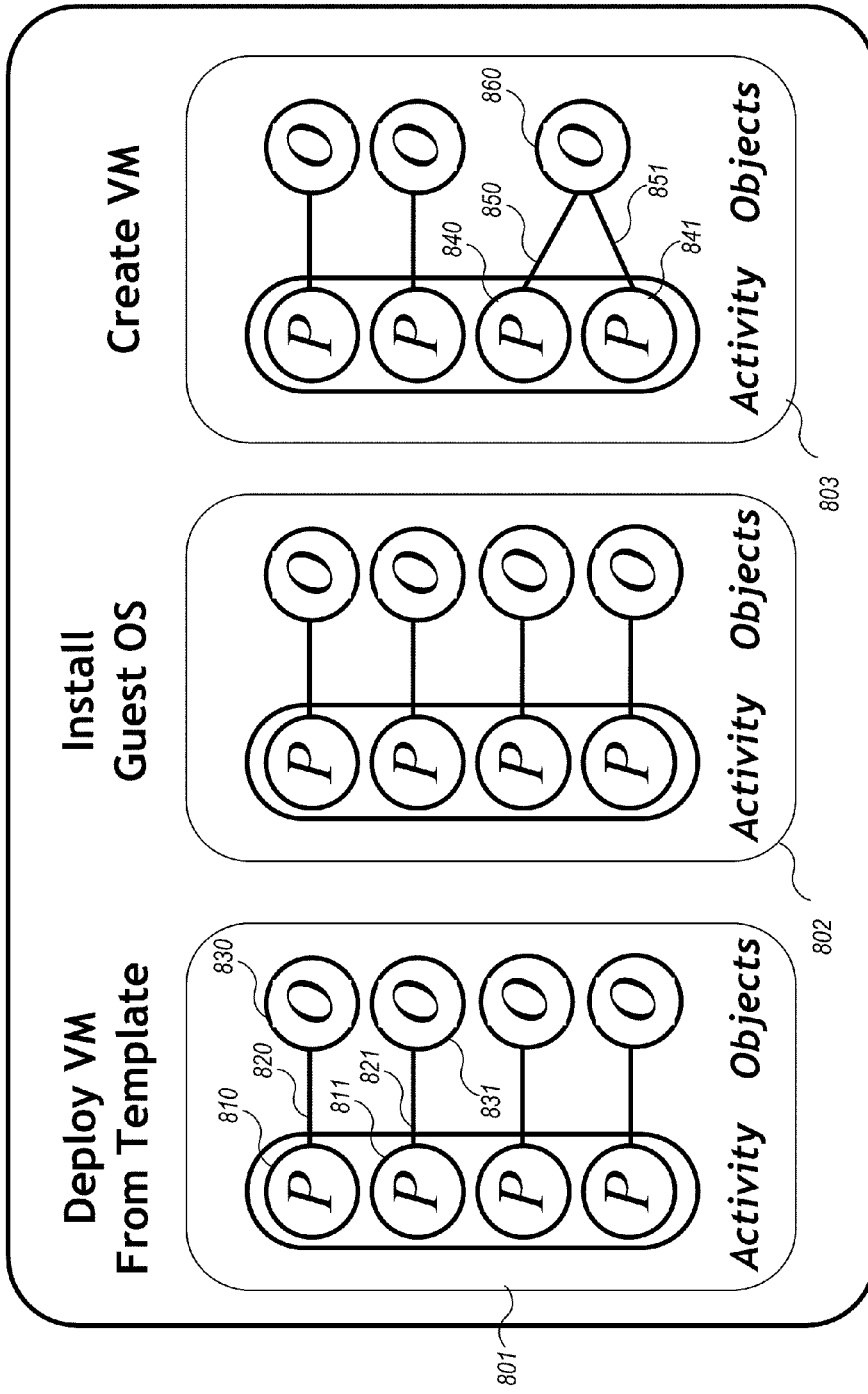
FIG. 8 is an example block diagram of a representation of a deployed proxy task object (e.g., a vBot).

As mentioned with respect to block 403 of FIG. 4, once created, a proxy task object may be deployed by associating each privilege with an object of the type indicated by the privilege. (Privileges may be thought of as corresponding to a particular object type.) FIG. 8 is an example block diagram of a representation of a deployed proxy task object (e.g., a vBot). In FIG. 8, the activities 701, 710, and 720 of FIG. 7 are shown as activities 801, 802, and 803 with their respective privileges bound to corresponding objects. For example, privilege 810 is associated with object 830 via link 820 and privilege 811 is associated with object 831 via link 821. As another example (where a single object is referred to or associated with two different privileges), for activity 803, privilege 840 is associated with object 860 via link 850 and privilege 841 is associated with object 860 via link 851.

As mentioned with respect to block 405 of FIG. 4, a deployed proxy task object may be assigned to one or more delegate (physical, virtual, or automated) users. Examples of such assignment are described with reference to portions of an example user interface for vBots below.

Figure 9A:
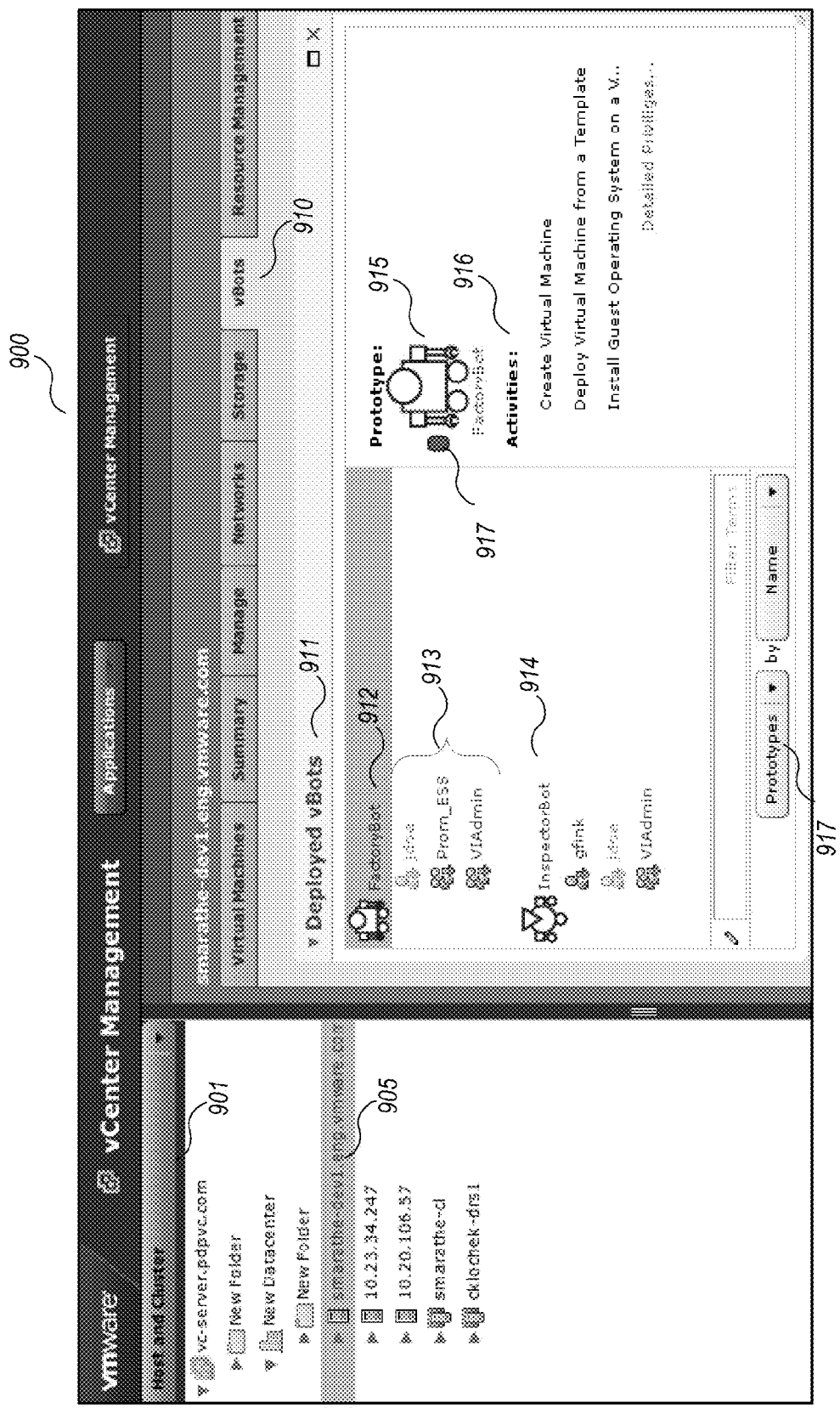
Figure 9B:
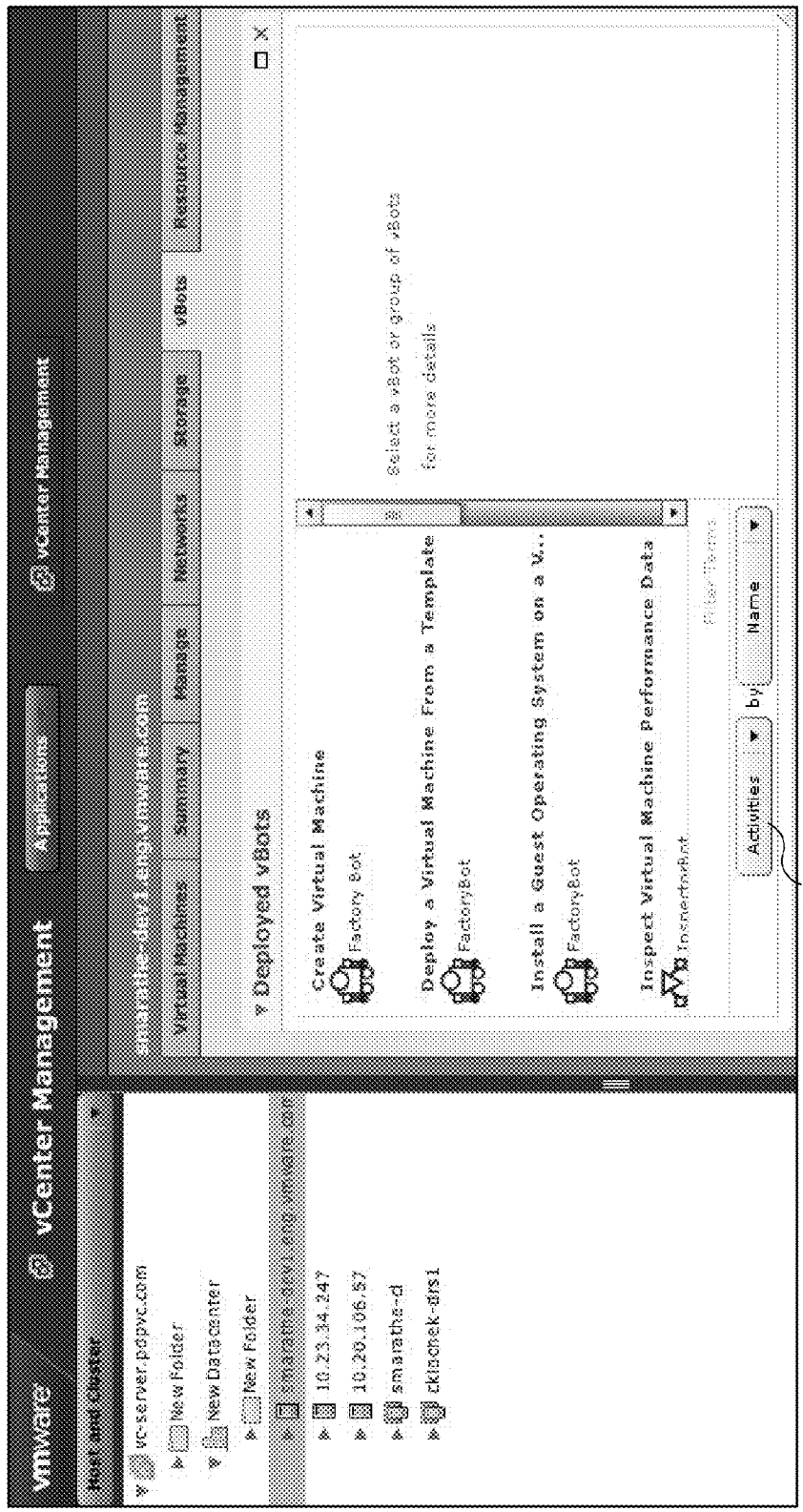

FIGS. 9A-9J are example screen displays of a user interface for generating, deploying, and assigning proxy task objects in a virtualization environment according to an example task-based access control system. FIG. 9A illustrates an enhanced virtualization environment datacenter administration tool for creating, deploying, and assigning vBots—an example of proxy task objects. In interface display 900, a user, presumably an administrator or equivalent, has selected an area of the infrastructure, here the hosts and clusters 901, to see what vBots have been created, deployed, and/or assigned. When a particular infrastructure object is selected, for example, the host 905, the panel 910 displays (deployed) vBots available for assignment. Here the deployed vBots 911 include a FactoryBot 912, which can be used to create virtual machines and an InspectorBot 914 which can be used to inspect the performance of a virtual machine. The interface also shows that the FactoryBot 912 is assigned currently to three users and/or groups 913: jdoe, Prom_ESS, VIAdmin. Further, since the FactoryBot 912 has been selected, the user interface 900 show a prototype 915 for that vBot (thus allowing additional such vBots to be created easily) and a list of the activities 916 available using that vBot. The "light up" icon 917 may be used to quickly enable and disable this vBot (for example, shown in green for enabled and red for disabled). A sort UI control 917 allows the administrator to change the display to an activities display 918 as shown in FIG. 9B.

Figure 9C:
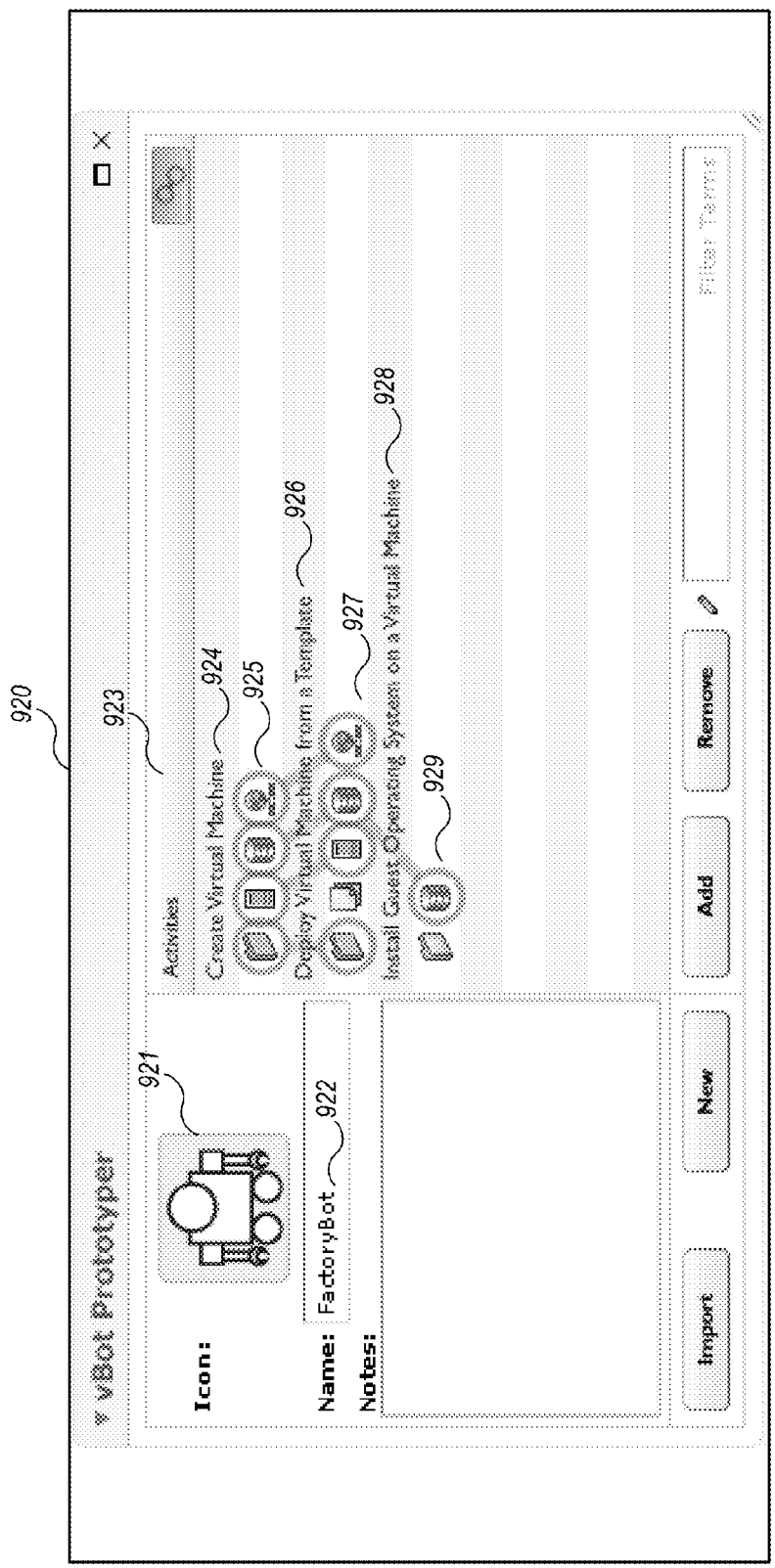

Selection of the prototype 915 for the FactoryBot in FIG. 9A allows the administrator to author (e.g., create, generate, etc.) a new FactoryBot. FIG. 9C illustrates the new FactoryBot 920, with icon 921 and name 922. The three activities defined for the vBot are shown on the right side of the display 923: create virtual machine 924; deploy virtual machine from a template 926, and install guest operating system on a virtual machine 928. In addition, each activity is displayed with its corresponding (unassigned) privileges. For example, the create virtual machine activity 924 comprises four privileges 925. The icons show the type of infrastructure object that needs to be assigned to each privilege. Thus, a kind of "type-checking" is offered by the interface.

Figure 9D:
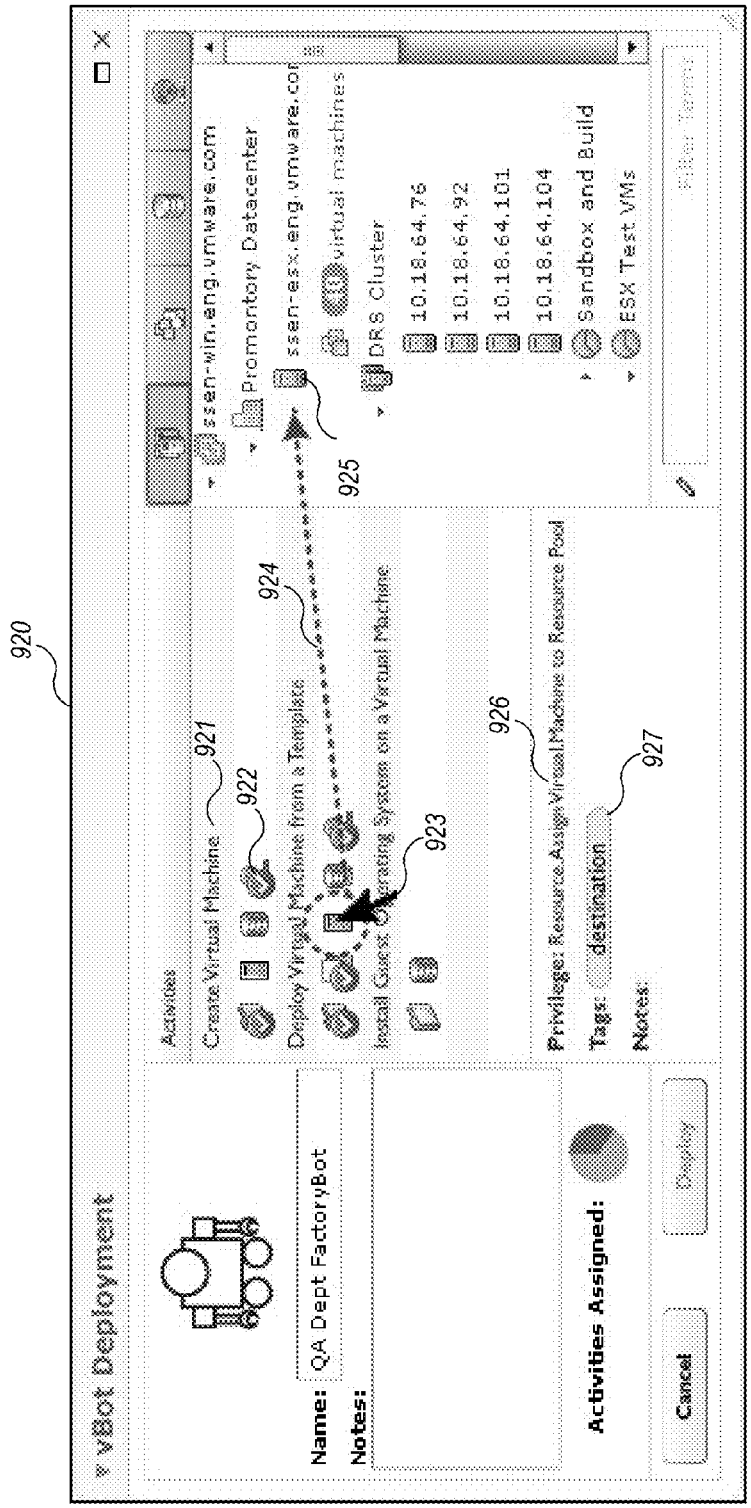

In order to deploy a vBot, this particular interface allows the administrator to drag the privilege using direct manipulation (e.g, drag an input device such as a mouse) from the privilege to an object representation in the infrastructure hierarchy to make the association: to bind the privilege to an object. In FIG. 9D, the cursor 933 is shown being dragged (934) to an object of the same type 935 to bind the privilege (described as Resource.Assign Virtual Machine to Resource Pool 936 corresponding to a host) to an actual host, represented by 935, in the infrastructure. The checkmarks, for example, checkmark 932 on a privilege of activity 931 signify that the privilege was correctly assigned to an inventory object. Of note, in some embodiments, certain privileges may be linked so that they apply to the same objects (e.g., to the same destination host). That is, some activities in a vBot may be linked as related, i.e., applicable to the same object. In such a case, the interface may automatically update the binding of linked objects to the same object.

Once deployed, the vBots may be assigned to one or more users or groups of users. FIGS. 9E-9J illustrate this process. In particular, in FIG. 9E, it is desired to assign the new FactoryBot 945 created to the group VC Users 942. According to display 940, the group VC Users 942 has been selected by the administrator. The currently assigned vBots assigned to this user 942 are shown in assigned vBot list 943. When the list is organized instead by activities (by invoking a sort UI control), the VC Dev FactoryBot entity 945 is seen under at least two of the activities.

Figures 9E, 9F:
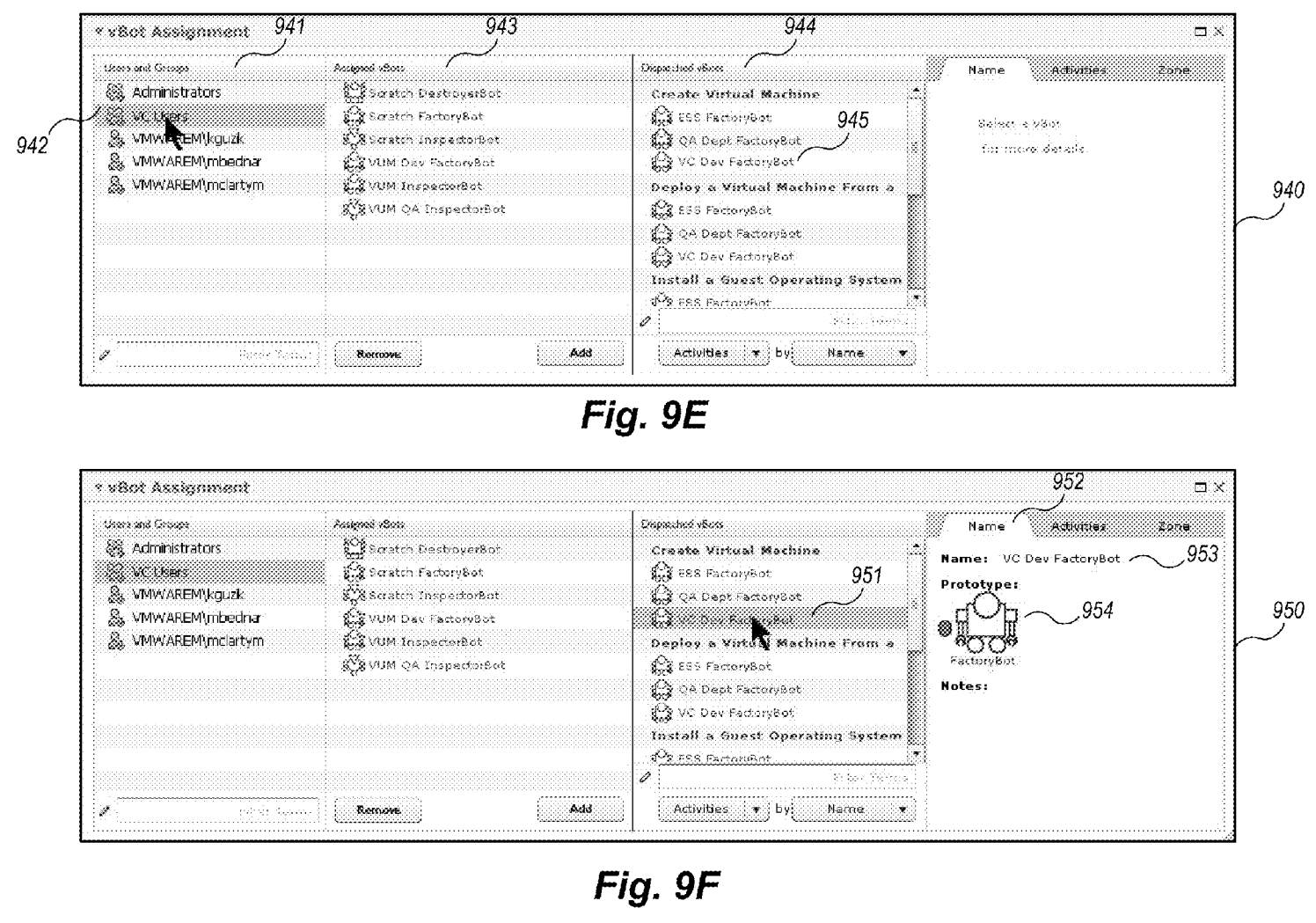
Figure 9G:
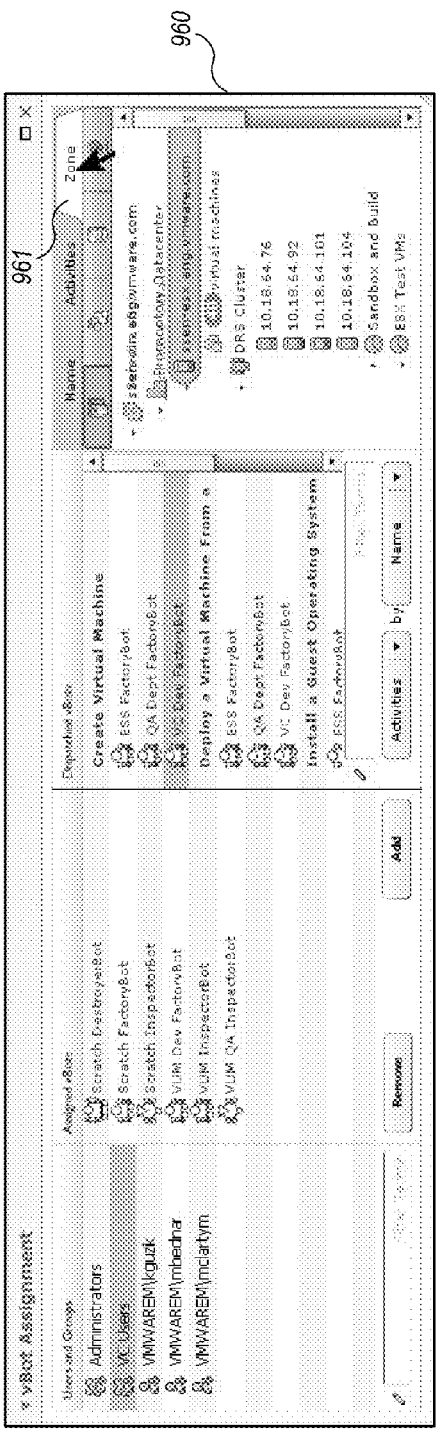
Figure 9H:
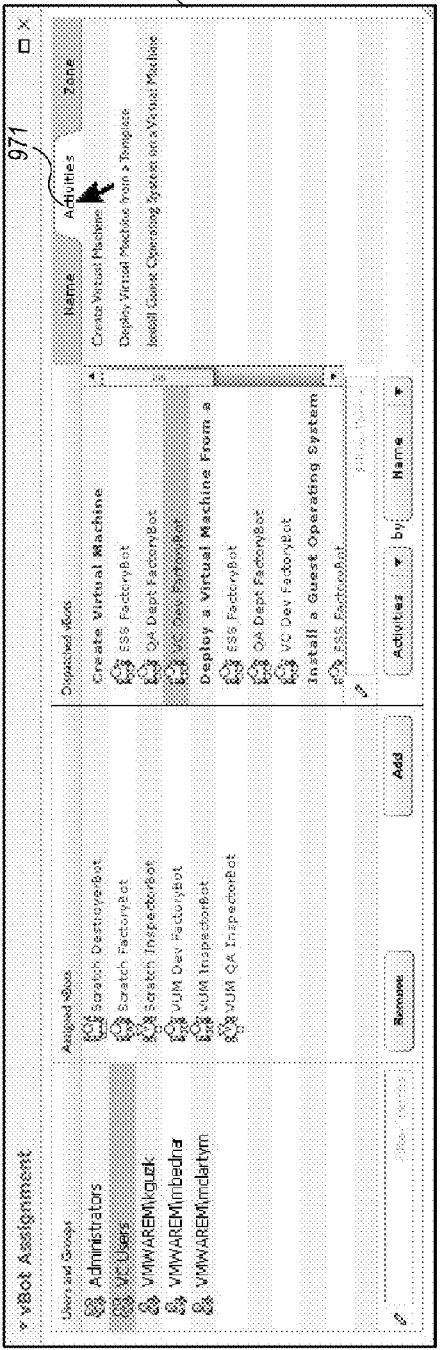

In display 950, as illustrated in FIG. 9F, the administrator has selected the new FactoryBot 951 and its details may be shown using tab 952. In display 960, as illustrated in FIG. 9G, the administrator has selected the "Zone" tab 961 to see where the vBot has been deployed (on what objects). In display 970, illustrated in FIG. 9H, the administrator has selected the activities tab to see a list 971 of the (3) activities for that vBot.

Figure 9I:
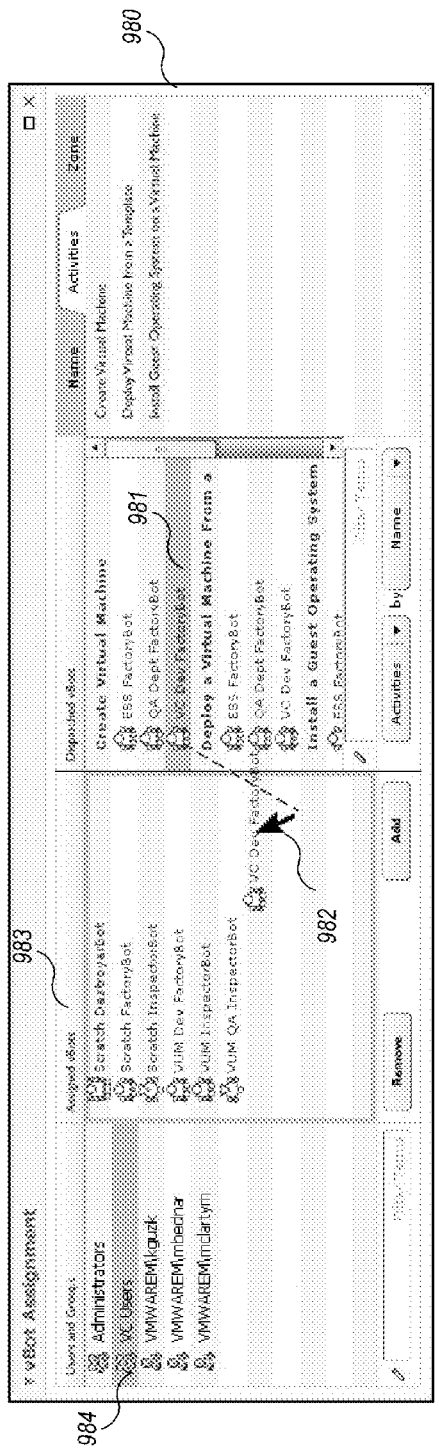
Figure 9J:
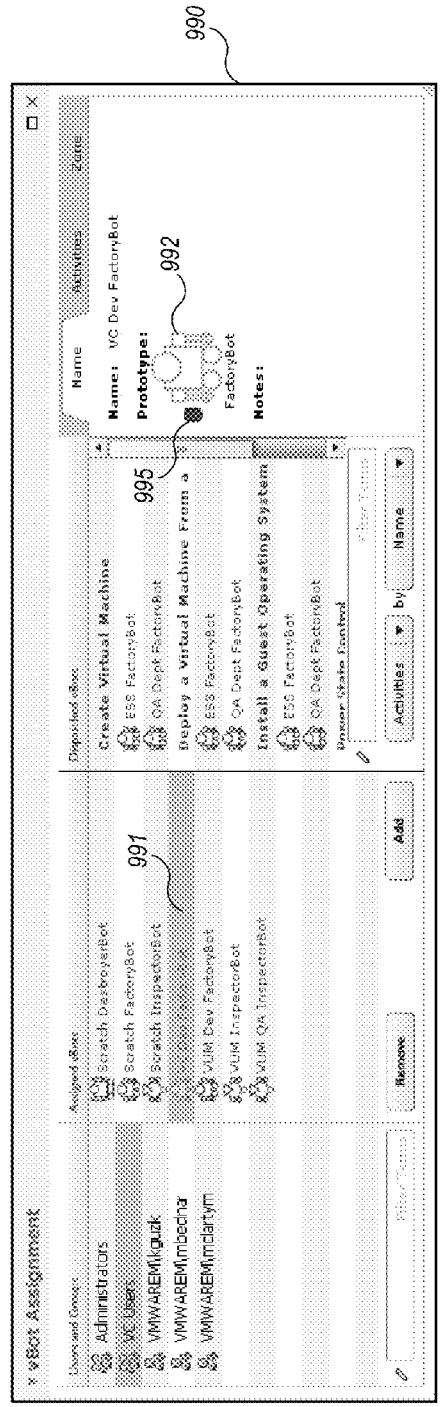

In display 980, illustrated in FIG. 9I, the administrator's cursor 982 is shown dragging the icon 981 corresponding to the new deployed vBot to the assigned vBots list 983 for the group VC Users 984. Finally, in display 990, illustrated in FIG. 9J, an indication of the new vBot 991 is shown in the list of vBots assigned to VC Users. The assignment of the new vBot has now been completed.

Figure 10A:
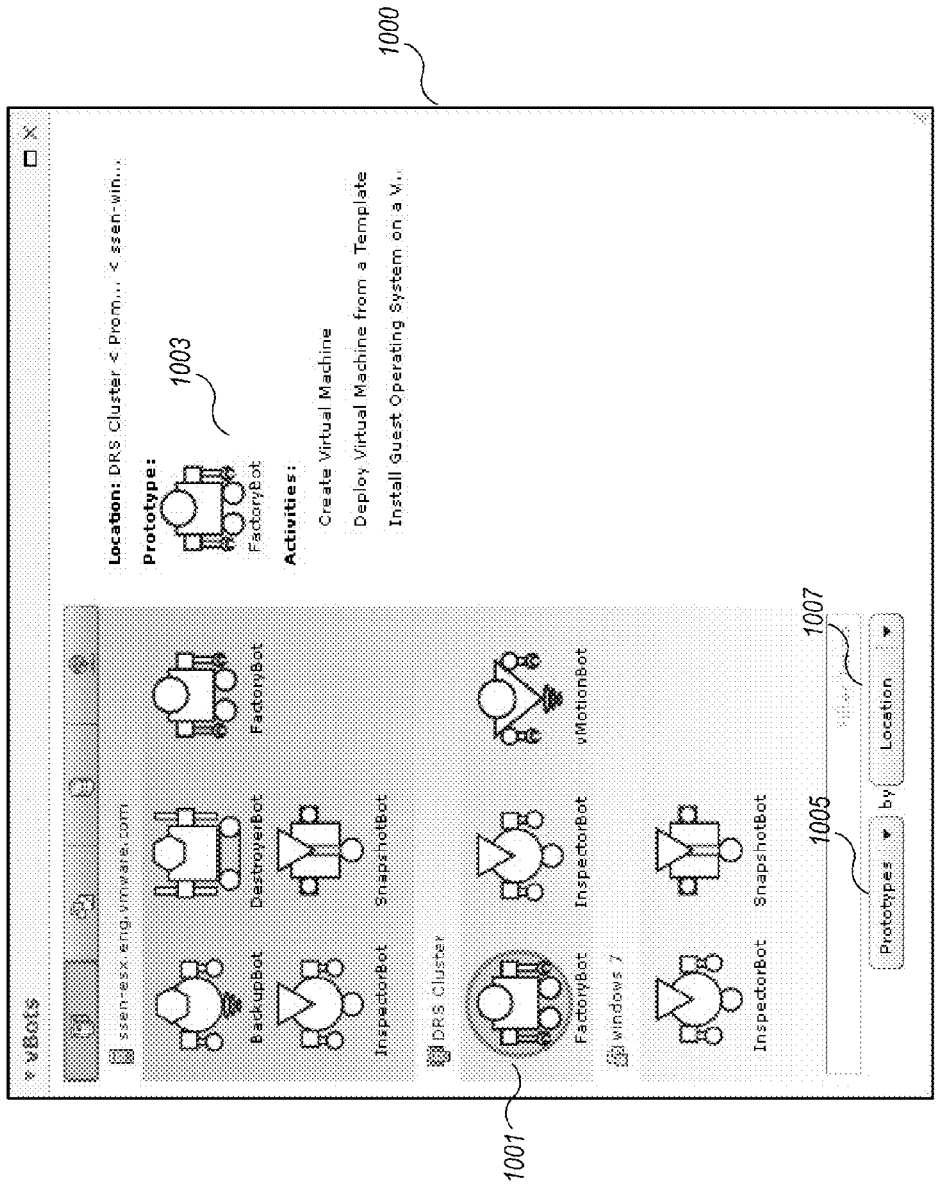
FIGS. 10A-10B are example user interfaces for launching proxy task objects to interact with the virtualization infrastructure.
Figure 10B:
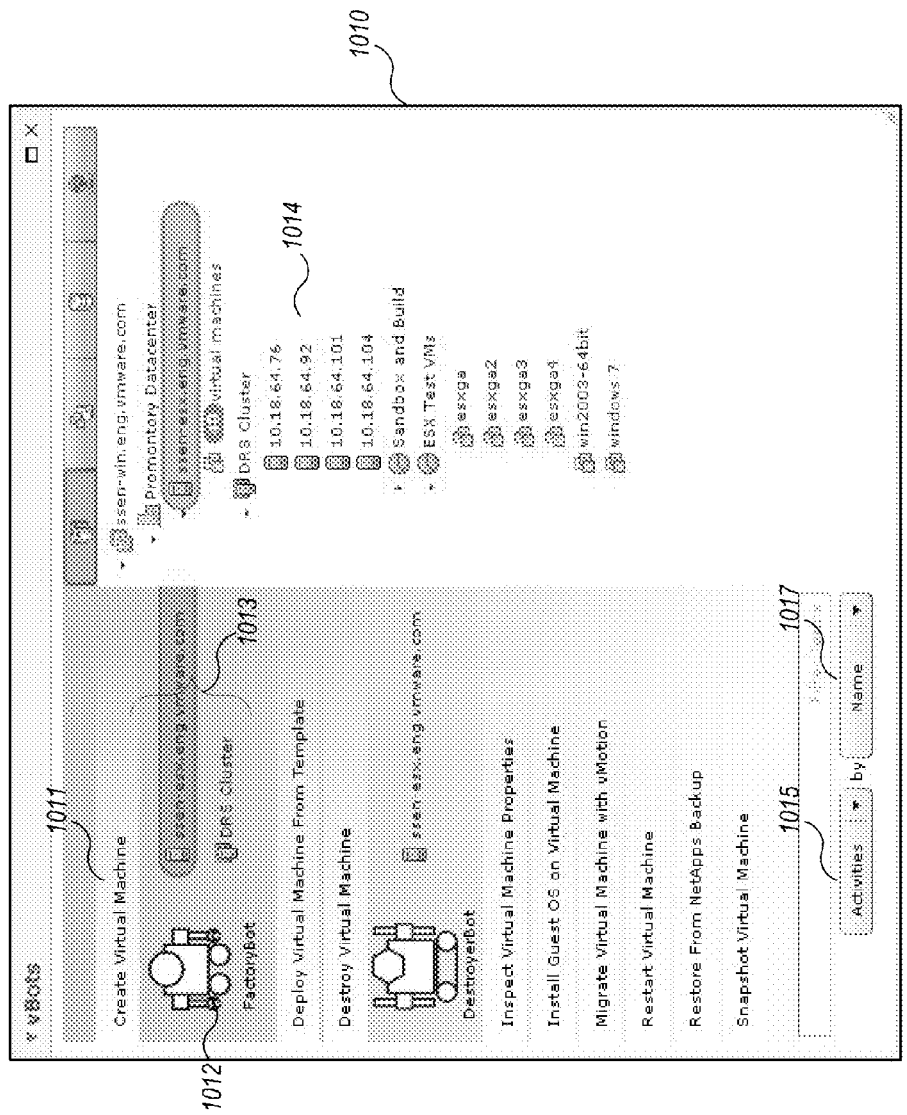

FIGS. 10A-10B are example user interfaces for launching proxy task objects to interact with the virtualization infrastructure. As illustrated in FIG. 10A, each proxy task object may have its own interface to perform a set of encapsulated tasks. Interface 1000 shows a list of "vBots" (proxy task objects) icons organized by location for various infrastructure objects, for example, the host machine "ssen-esx.enng.vmware.com." Upon selection of a vBot, e.g., the FactoryBot 1001, on the right the user interface displays the activities (create virtual machine, deploy virtual machine from a template, and install guest OS on a machine) associated with a "FactoryBot" proxy task object 1003. This list can be sorted, and hence the user interface modified, by selecting the sort user interface controls 1005 and 1007.

In FIG. 10B, when the list of proxy task objects is sorted by activities using sort button 1015 and name using sort button 1017, then a list of activities 1011 is displayed, with the corresponding vBots (e.g. FactoryBot 1012) and objects to which the vBot is assigned (e.g., objects 1013). The display on the right hand side 1014 now shows information relative to the selection on the left—here an infrastructure object from the managed object inventory. Other user interfaces may be incorporated similarly.

Example embodiments described herein provide applications, tools, data structures and other support to implement a task-based access control system to be used for delegating permissions in a virtualization environment. Other embodiments of the described techniques may be used for other purposes, including for delegating permissions in a non-virtualized computing system environment. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described is not limited by the particular order, selection, or decomposition of steps described with reference to any particular routine. Also, although certain terms are used primarily herein, other terms could be used interchangeably to yield equivalent embodiments and examples. In addition, terms may have alternate spellings which may or may not be explicitly mentioned, and all such variations of terms are intended to be included.

Figure 11:
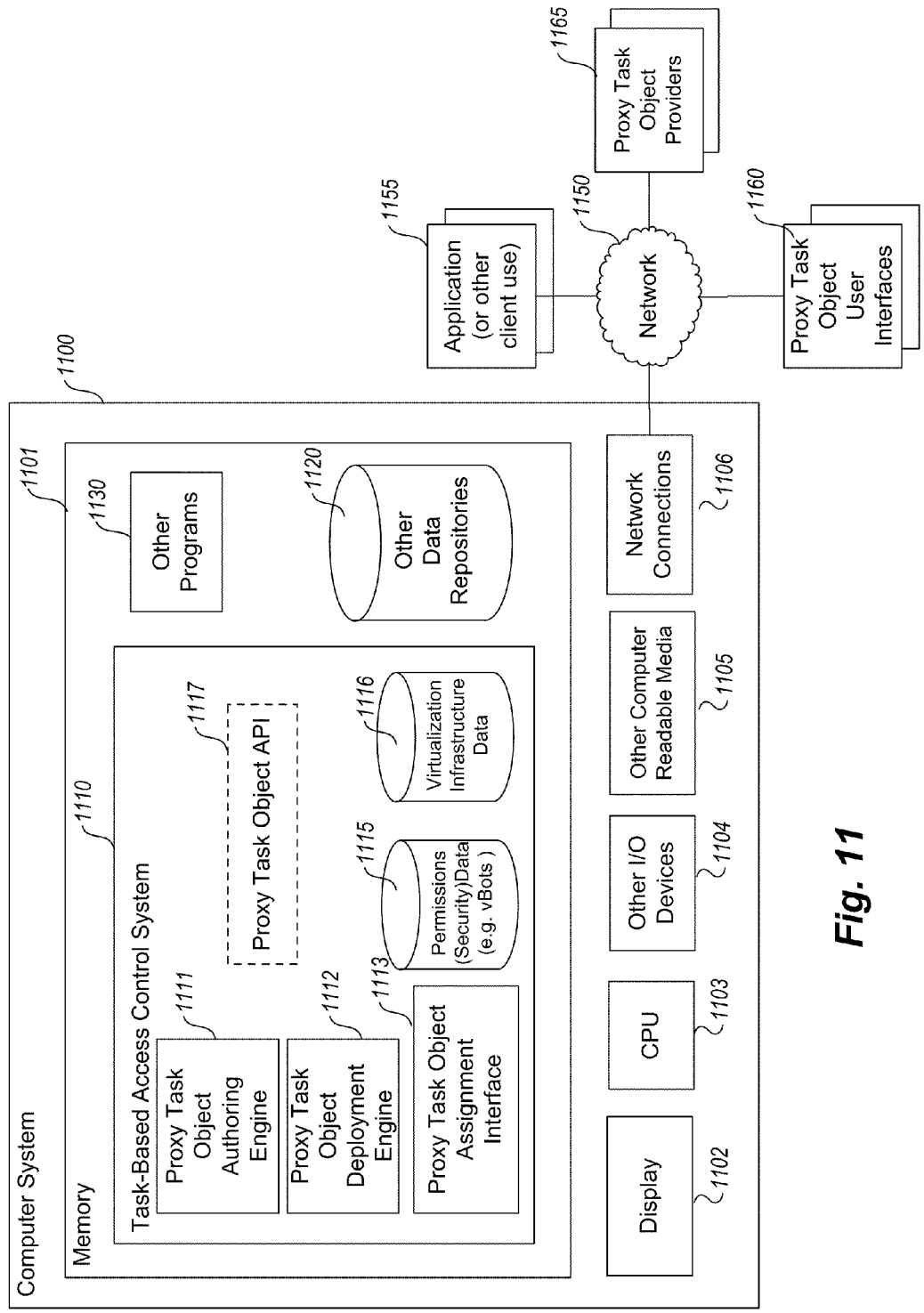
FIG. 11 is an example block diagram of a computing environment for practicing embodiments of a task-based access control system.

FIG. 11 is an example block diagram of an example computing system that may be used to practice embodiments of a task-based access control system described herein. Note that a general purpose or a special purpose computing system suitably instructed may be used to implement an TBACS. Further, the TBACS may be implemented in software, hardware, firmware, or in some combination to achieve the capabilities described herein.

The computing system 1100 may comprise one or more server and/or client computing systems and may span distributed locations. As illustrated, the computing system 1100 shows a set of components that may be used to implement task-based access control. Some of these components may in whole or in part reside on one or more server systems; some may in whole or in part reside on one or more client computing systems; and some may in whole or in part have both server and client portions. For example, client-side user interface components for engines 1111, 1112, and 1113 may run in addition to the server-side engines. In addition, each block shown may represent one or more such blocks as appropriate to a specific embodiment or may be combined with other blocks. Moreover, the various blocks of the task-based access control system 1110 may physically reside on one or more machines, which use standard (e.g., TCP/IP) or proprietary interprocess communication mechanisms to communicate with each other.

In the embodiment shown, computer system 1100 comprises one or more computer memories ("memory") 1101, a display 1102, one or more Central Processing Units ("CPU") 1103, Input/Output devices 1104 (e.g., keyboard, mouse, CRT or LCD display, etc.), other computer-readable media 1105, and one or more network connections 1106. The TBACS 1110 is shown residing in memory 1101. In other embodiments, some portion of the contents, some of, or all of the components of the TBACS 1110 may be stored on and/or transmitted over the other computer-readable media 1105. The components of the task-based access control system 1110 preferably execute on one or more CPUs 1103 and manage the generation and use of proxy task objects (e.g., vBots), as described herein. Other code or programs 1130 and potentially other data repositories, such as data repository 1106, also reside in the memory 1101, and preferably execute on one or more CPUs 1103. Of note, one or more of the components in FIG. 11 may not be present in any specific implementation. For example, some embodiments embedded in other software may not provide means for user input or display.

In a typical embodiment, the TBACS 1110 includes one or more proxy task object authoring engines 1111, one or more proxy task object deployment engines 1112, and one or more proxy task object assignment interfaces 1113. As described above, the proxy task object authoring engines 1111 are responsible for building objects with activities having one or more privileges associated with them. When authored, the privileges may be associated with particular types of objects, but they may not yet be in deployable form—with a specific inventory managed object associated with a respective privilege.

The proxy task object deployment engines 1112 are responsible for resolving the object type references of each privilege of each activity of the object to specific objects of the managed object inventory. When each privilege is resolved (i.e., associated with an assigned managed inventory object), the proxy task object is releasable for assignment as a proxy task object to be assigned to delegate users.

The proxy task object assignment interface 1113 is responsible for allowing the proxy task object (with its privilege—object pair associations) to be assigned to a user. As indicated above, proxy task objects may be assigned to one or more users or groups of users based upon the task the user desires to perform.

In at least some embodiments, the authoring engine 1111 is provided external to the TBACS and is available, potentially, over one or more networks 1150. Other and/or different modules may be implemented. In addition, the TBACS may interact via a network 1150 with application or client code 1155, for example web browsers, automation code, other virtualization applications and the like, that uses the objects generated by the task-based access control system 1110; one or more proxy task object user interfaces 1160 specifically designed to be executed with particular proxy task objects, for example; and/or one or more third-party proxy task object providers 1165, such as purveyors of information used in permissions (security) data repository 1115. Also, of note, the virtualization infrastructure data repository 1116 may be provided external to the TBACS as well, for example in a knowledge base accessible over the one or more networks 1150.

In an example embodiment, components/modules of the TBACS 1110 are implemented using standard programming techniques, including object-oriented techniques, distributed techniques, and the like. A range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an TBACS implementation. Also, other steps could be implemented for each routine, and in different orders, and in different routines, yet still achieve the functions of the task-based access control system.

In addition, application programming interfaces 1117 to the data stored as part of the task-based access control system 1110 (e.g., in the data repositories 1115 and 1116) can be available by standard means such as through C, C++, C#, and Java APIs; libraries for accessing files, databases, or other data repositories; through scripting languages such as XML; or through Web servers, FTP servers, or other types of servers providing access to stored data. The data repositories 1115 and 1116 may be implemented as one or more database systems, file systems, or any other method known in the art for storing such information, or any combination of the above, including implementation using distributed computing techniques.

Also the example TBACS 1110 may be implemented in a distributed environment comprising multiple, even heterogeneous, computer systems and networks. For example, in one embodiment, the proxy task object authoring engine 1111, the proxy task object deployment engine 1112, and the permissions data repository 1115 are all located in physically different computer systems. In another embodiment, various modules of the TBACS 1110 are hosted each on a separate server machine and may be remotely located from the tables which are stored in the data repositories 1115 and 1116. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of an TBACS.

Furthermore, in some embodiments, some or all of the components of the TBACS may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the components and/or data structures may be stored on tangible storage mediums. Some or all of the system components and data structures may also be transmitted in a non-transitory manner via generated data signals (e.g., as part of a carrier wave or other analog or digital propagated signal) on a variety of computer-readable transmission mediums, such as media 1105, including wireless-based and wired/cable-based mediums, and may take a variety of forms (e.g., as part of a single or multiplexed analog signal, or as multiple discrete digital packets or frames. Such computer program products may also take other forms in other embodiments. Accordingly, embodiments of this disclosure may be practiced with other computer system configurations.

As described, the example task-based access control system may be implemented as an overlay on a role-based system, or other object-centric system. In particular, overlaying the existing system may be made possible by implementing the task-based access control system as an interface to data already stored according to other paradigms.

Figure 12:
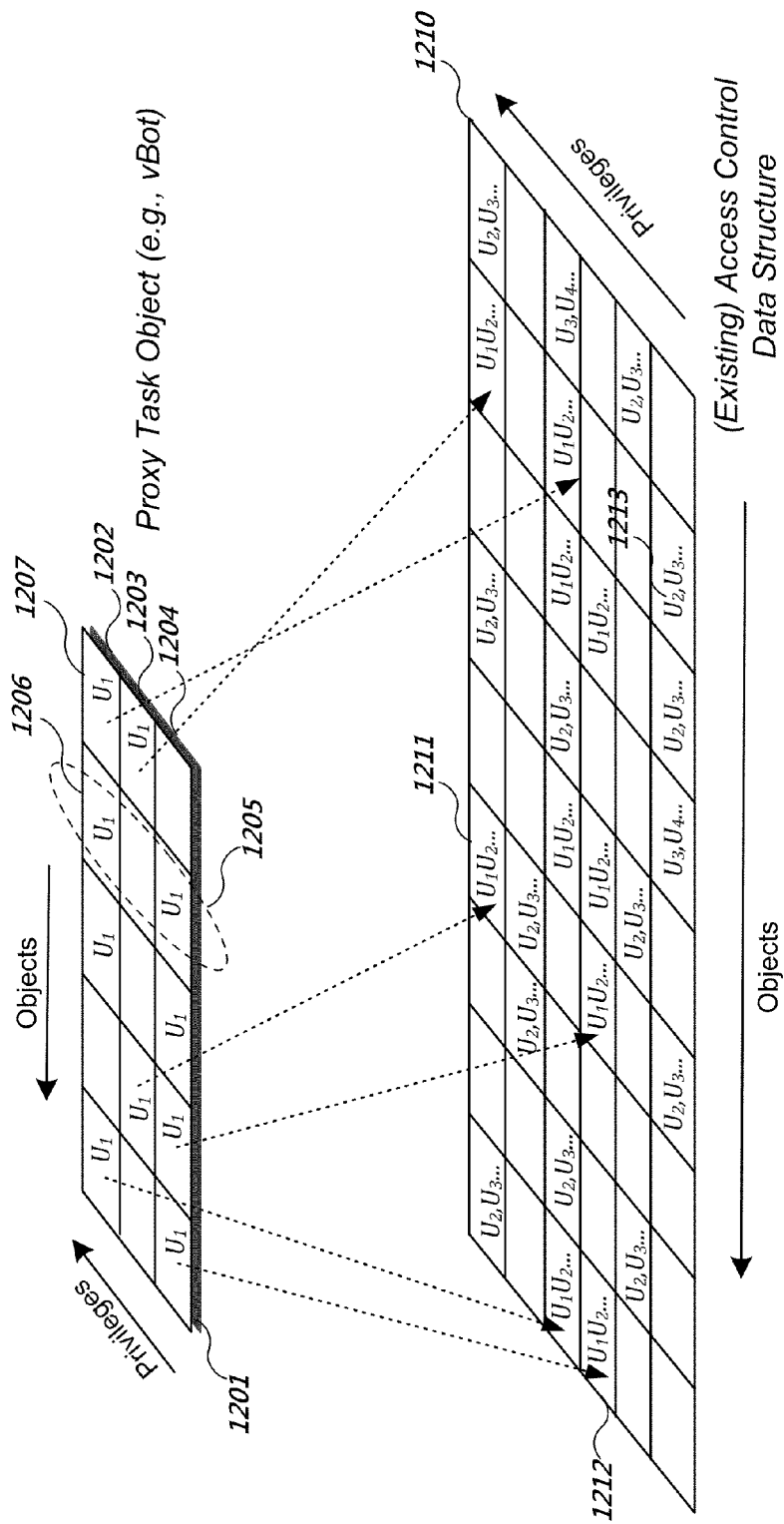
FIG. 12 is an example block diagram of an example data structure for overlaying task-based access control information on an existing access control data structure.

FIG. 12 is an example block diagram of an example data structure for overlaying task-based access control information on an existing access control data structure. For example, as illustrated in FIG. 12, the data structure 1201 for a proxy task object is shown with fields "linked" (or otherwise mapped) to fields of an existing access control data structure 1210.

Existing access control data structure 1210 comprises at least two dimensions: objects 1211 shown as columns and privileges 1212 shown as rows. Each cell, understood to be the intersection of an object with a privilege, when assigned, is populated by an indication of one or more users (or groups, or other designations) that have been assigned that particular privilege for that particular object. For example, cell 1213 indicates that users $U_2$ and $U_3$ have the permissions indicated by the position of the intersection of object 1211 with privilege 1212. As shown here, there is a cell for every object-privilege combination. In some systems, access control information may be stored using sparse data techniques.

The proxy task object (e.g., vBot) data structure 1201 stores how activities (i.e., groups of privileges) are bound to objects and assigned to users. For example, as shown in FIG. 12, vBot 1201 contains (three different) activities bound to various managed inventory objects, for example objects 1206 and 1207, in the virtualization infrastructure. Each activity is stored as a group of privileges. For example, activity 1205, shown marked with a dashed oval line, is bound to object 1206 and is a group containing privilege 1202 and privilege 1204. The activity bound to object 1207 (not marked) is a group containing privilege 1202 and 1203. Thus, data structure 1201 stores (shown as rows 1202-1204) the union of all of the privileges that are present in all of the activities authored in a proxy task object. When the proxy task object is first authored, it may only consist of activities (groups of privileges) with a "column" for each activity. When the proxy task object is deployed, the activities are stored bound to objects. (Columns may be replicated for each object, or, in some embodiments, shared between multiple objects). Before assignment to a user, each "cell" (each privilege of each activity) can be considered assigned to an abstract user (for example, represented by a "?" or an "x"). When the proxy task object is assigned to a user, the "cells" indicating a privilege-object intersection are assigned to a specific user (e.g., user $U_1$) and the data structure appropriately altered so that each proxy task object cell with data can be mapped to an underlying cell (object-privilege combination) in the existing access control data structure 1210.

A task-based access control mechanism such as that described herein also may be overlaid upon techniques for storing access control information other than those illustrated in FIG. 12. Also, although shown as tables with rows and columns, it is understood that any equivalent or substitute data structures may be used, including, for example, matrices, sparse-matrix structures, linked lists, hash tables, arrays, other objects, and the like.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/311,482, entitled "vBOTS: EMBODIMENT OF ACCESS CONTROL," filed Mar. 8, 2010, is incorporated herein by reference, in its entirety.

From the foregoing it will be appreciated that, although specific embodiments have been described herein for purposes of illustration, various modifications may be made without deviating from the spirit and scope of the present disclosure. For example, the methods, systems, and techniques for performing task-based access control discussed herein are applicable to other architectures other than a virtualization architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method in a computer-based virtualization environment for providing task-based access to one or more delegate users for performing a plurality of activities on inventory objects managed by the virtualization environment, comprising:
under control of a computing system in the computer-based virtualization environment,
generating one or more proxy task objects for performing the plurality of activities on inventory objects managed by the virtualization environment, each proxy task object representing at least one activity through one or more designated privileges associated with one or more of the inventory objects, such that each designated privilege of each activity of each proxy task object is associated with a designated one of the one or more inventory objects;
storing the generated one or more proxy task objects in a memory of the computer-based virtualization environment; and
facilitating, through reference to one or more desired activities, the assignment of at least one of the generated and stored one or more proxy task objects to one or more delegate users as an encapsulated task bundle, such that the one or more delegate users are automatically permitted, under control of the computer-based virtualization environment, to perform the at least one activity represented by the at least one proxy task object of the encapsulated task bundle, on the one or more associated designated inventory objects, wherein proxy task object generation and assignment is implemented on top of an existing role-based access permissions mechanism.

2. The method of claim 1 wherein the encapsulated task bundle is assigned to a first delegate user, and further comprising:
in a single user interface action, facilitating temporary disablement of the encapsulated task bundle from the assigned first delegate user such that the first delegate user is automatically no longer able to perform the at least one activity represented by the encapsulated task bundle.

3. The method of claim 2, further comprising:
re-enabling the temporary disablement of the encapsulated task bundle from the assigned first delegate user so that the first delegate user is again automatically able to perform the at least one activity represented by the encapsulated task bundle.

4. The method of claim 1 wherein the encapsulated task bundle is assigned to a first delegate user, and further comprising:
facilitating sharing the encapsulated task bundle with a second delegate user.

5. The method of claim 4 wherein the sharing comprises cloning or lending.

6. The method of claim 1 wherein the encapsulated task bundle is assigned to a first delegate user, and further comprising:
facilitating limiting the length of time the encapsulated task bundle is assigned to the first delegate user.

7. The method of claim 1 wherein the encapsulated task bundle is assigned to a first delegate user, and further comprising:
modifying the one or more inventory objects associated with the at least one proxy task object of the encapsulated task bundle to refer to a different and distinct one or more inventory objects managed by the virtualization environment, such that first delegate user is automatically provided access to the different and distinct one or more inventory objects without modification of the assignment of the encapsulated task bundle to the first delegate user.

8. The method of claim 1, further comprising;
providing a specialized user interface associated with one or more of the proxy task objects such that when a proxy task object with an associated specialized interface is assigned as an encapsulated task object to one or more delegate users, and when the one or more delegate users initiates execution of the assigned encapsulated task object associated with the specialized interface, the specialized interface is executed.

9. The method of claim 1, further comprising:
facilitating the assignment of at least one of the generated and stored one or more proxy task objects to a proxy for one or more delegate users as an automated encapsulated task bundle, such that, under control of the computer-based virtualization environment, the at least one activity represented by the at least one proxy task object of the encapsulated task bundle is automatically performed in an automated manner by the proxy for one or more delegate users, on the one or more associated designated inventory objects.

10. The method of claim 1 wherein the facilitating the assignment is performed using a direct manipulation user interface technique.

11. The method of claim 1 wherein a system administrator of the virtualization environment can discover activities permitted by a delegate user by observation of assigned encapsulation bundles.

12. The method of claim 1 wherein the inventory objects managed by the virtualization environment comprise one or more of a folder, a virtual machine, a resource pool, a cluster, a host, a network, and/or a data store.

13. The method of claim 1 wherein the inventory objects managed by the virtualization environment comprise one or more of an entity, object, control and/or process.

14. The method of claim 1 wherein the one or more proxy task objects comprise a data structure with fields mapped to fields of an existing access control data structure of the existing role-based access permissions mechanism.

15. The method of claim 14;
wherein the existing access control data structure comprises two dimensions, objects and privileges, in which each field of the existing access control data structure, when assigned, is populated by an indication of a user that has been assigned that particular privilege for that particular object; and
wherein the proxy task object data structure comprises fields that comprise two dimensions, objects and privileges, and which are assigned to a user, and wherein a field of the proxy task object data structure is mapped to a field in the existing access control data structure that has a matching intersection of an object and a privilege and the same assigned user.

16. A computer-readable storage device containing contents that, when executed on a computer processor, provide task-based access to one or more delegate users for performing a plurality of activities on inventory objects managed by a virtualization environment by performing a method comprising:

generating a plurality of encapsulated task objects for defining permissions to engage in the plurality of activities on the inventory objects managed by the virtualization environment, each encapsulated task object containing a plurality of designated privileges that represent a plurality of activities, each designated privilege associated with a designated one of the inventory objects;

storing the generated plurality of encapsulated task objects in a computer memory; and without reference to a role, assigning the stored encapsulated task objects to a plurality of delegate users, such that the plurality of delegate users are automatically permitted, under control of the computer-based virtualization environment, to perform the plurality of activities represented by each of the encapsulated task objects on the one or more associated designated inventory objects associated with each of the plurality of activities of each of the encapsulated task objects;

the method causing invocation of an underlying role-based permissions model to perform the method.

17. The computer-readable storage device of claim 16 wherein the storage medium is a memory of a computing system and the contents are instructions that, when executed, cause the computer processor to perform the method.

18. The computer-readable storage device of claim 16, the method further comprising:

providing a graphical user interface to assign the plurality of encapsulated task objects to the plurality of delegated users.

19. The computer-readable storage device of claim 16 wherein one or more of the plurality of activities of one or more of the plurality of encapsulated task objects are associated with specialized user interfaces, wherein the specialized user interfaces are invoked when the associated activity is initiated.

20. The computer-readable storage device of claim 16, the method further comprising:

temporarily disabling and/or enabling access of a delegated user to one of the plurality of encapsulated task objects.

21. The computer-readable storage device of claim 16, the method further comprising:

sharing, cloning, and/or using as a template one of the plurality of encapsulated task objects with a delegate user other than one to which the one of the plurality of encapsulated task objects was assigned.

22. The computer-readable storage device of claim 16 wherein the inventory objects managed by the virtualization environment comprise one or more of a folder, a virtual machine, a resource pool, a cluster, a host, a network, and/or a data store.

23. The computer-readable storage device of claim 16 wherein the inventory objects managed by the virtualization environment comprise one or more of an entity, object, control and/or process.

24. A computer-readable storage device containing contents that, when executed on a computer processor, provides task-based access to one or more delegate users for performing a plurality of tasks on objects managed by a virtualization environment, by performing a method comprising:

facilitating task-based access to a plurality of objects managed by the virtualization environment by overlaying an existing object centric permissions model that assigns role-user pairs to the managed objects with a computer-driven user interface that receives input for grouping privileges into activities, bundles the activities with one or more managed objects so that tasks requiring the grouped privileges can be performed on the one or more managed objects, and assigns the bundled activities to one or more delegate users to enable the one or more delegate users to perform the tasks on the one or more managed objects.

25. The computer-readable storage device of claim 24 wherein the overlaying further comprises:

storing the bundled activities in an encapsulated object.

26. The computer-readable storage device of claim 25 wherein the encapsulated object is a vBot.

27. The computer-readable storage device of claim 25 wherein each encapsulated object comprises a data structure with fields mapped to fields of a data structure of the existing object centric permissions model.

28. The computer-readable storage device of claim 27 wherein a field of the encapsulated object is mapped to a field in the data structure of the existing object centric permissions model that has a matching intersection of an object and a privilege and the same assigned user.

29. The computer-readable storage device of claim 24, further comprising: invoking the encapsulated object to automatically perform a task on behalf of a delegate user.

30. The computer-readable storage device of claim 24 wherein the storage medium is a memory of a computing system and the contents are instructions that, when executed, cause the computer processor to perform the method.

* * * * *